United States Patent [19]

Murphy et al.

[11] Patent Number: 5,813,025

[45] Date of Patent: Sep. 22, 1998

[54] SYSTEM AND METHOD FOR PROVIDING VARIABLE SECTOR-FORMAT OPERATION TO A DISK ACCESS SYSTEM

[75] Inventors: Philip A. Murphy, King of Prussia; Timothy D. Updegrove, Birdsboro; John A. Keller, Coatesville, all of Pa.

[73] Assignee: Unisys Corporation, Blue Bell, Pa.

[21] Appl. No.: 758,836

[22] Filed: Dec. 2, 1996

Related U.S. Application Data

[62] Division of Ser. No. 288,465, Aug. 10, 1994, abandoned.

[51] Int. Cl.⁶ .................................................. G06F 12/00
[52] U.S. Cl. ...................................... 711/114; 364/DIG. 1
[58] Field of Search ............................... 395/182.04, 439, 395/441, 411, 419, 412, 182.08; 360/48; 711/112, 114, 201, 209, 202

[56] References Cited

U.S. PATENT DOCUMENTS 5,463,762 10/1995 Morrissey et al. .................. 395/185.02
5,497,476 3/1996 Oldfield et al. ......................... 395/439
5,526,507 6/1996 Hill ........................................ 395/441

*Primary Examiner*—Tod R. Swann
*Assistant Examiner*—Denise Tran
*Attorney, Agent, or Firm*—John B. Sowell, Esq.; Mark T. Starr, Esq.

[57] ABSTRACT

A system and method are disclosed for providing computers, particularly the Unisys A series computers, with the capability to function with disk drives of more than one sector format, especially if a predetermined sector format is inefficient and/or cost prohibitive. Interfacing is provided for processing I/O requests between a predetermined logical sector format (e.g., 180 byte sectors) and a variable physical sector format (e.g., 512 or 720 byte sectors). Read operations compare read request addresses to physical sector boundaries and discard unwanted data. Write operations, using at least one sector buffer, perform a read/modify/write cycle, such that the necessary physical sector data not associated with the write request is read into the sector buffer, modified and written back to the disk along with the write data inserted at the appropriate location. This system and method can effectively increase the usable capacity of selected disk drives by 15–20%.

8 Claims, 23 Drawing Sheets

| MODEL | TOTAL CAPACITY | 512 BYTE FORMAT | % OF CAPACITY | 180 BYTE FORMAT | % OF CAPACITY |
|---|---|---|---|---|---|
| USD400-S20 | 608MB | 520 MB | 86% | 419MB | 69% |
| USD1000-X20 | 1.2GB | 1.0GB | 83% | .8GB | 67% |
| USD2000-D20 | 2.4GB | 2.0GB | 83% | 1.5GB | 63% |

*Figure 1*

*(Prior Art)*

```
         51:4   47:8   39:8   31:8   23:8   15:8   07:8
        +------+------+------+------+------+------+------+
Word 0  |  x   | T000 | T001 | D002 | D003 | D004 | D005 |
        +------+------+------+------+------+------+------+
     1  |  x   | D006 | D007 | T008 | T009 | D010 | D011 |
        +------+------+------+------+------+------+------+
     2  |  x   | D012 | D013 | D014 | D015 | T016 | T017 |
        +------+------+------+------+------+------+------+
     3  |  x   | D018 | D019 | D020 | D021 | D022 | D023 |
        +------+------+------+------+------+------+------+
```

SYSTEM AND METHOD FOR PROVIDING VARIABLE SECTOR-FORMAT OPERATION TO A DISK ACCESS SYSTEM

This is a divisional of application Ser. No. 08/288,465, filed on Aug. 10, 1994, now abandoned.

FIELD OF THE INVENTION

The present invention generally relates to accessing sector-formatted data and, more particularly, it relates to accessing data, using variable sector formatting options, from different types of disks.

BACKGROUND OF THE INVENTION

As computer systems were developed throughout the years, computer manufacturers had to select certain specifications for the various aspects of their systems. Some of the specifications were easily selected if accepted standards were available but others were not so easily selected if standards were not universally agreed upon. One example of a specification which had to be selected during development is the number of bytes allocated for a sector-formatted memory (e.g., disk). This specification was very important because it impacted system aspects such as inter-system compatibility and system performance.

In particular, Unisys Corporation, in its A Series computers, selected a specification such that disks were formatted using a 180 byte sector format. As the A series computers evolved, it was discovered that using a 180 byte sector format may result in a loss of user accessible capacity per drive when compared to other formats. Additionally, as the physical size of disks are reduced from 8 inches to 5.25 inches to 3.5 inches and so on, the amount of user capacity forfeited because of the 180 byte formatting requirement increases.

FIG. 1 is a table which illustrates the differences in usable capacity between three USD disk drives formatted with 512 byte sectors and with 180 byte sectors. Nearly 20% of the unformatted capacity of each disk is lost between the 512 byte sector format and the 180 byte sector format. In addition, since 180 byte sector format disk devices are not standard, the 512 byte sector devices are also less expensive.

Because A Series users, like all sophisticated computer users, are very sensitive to the cost/Mbyte of disk products, it is desirous to develop a disk access technique which prevents forfeiture of user capacity due to the 180 byte sector formatting.

SUMMARY OF THE INVENTION

The present invention involves a method and system for providing a disk access system, having a predetermined logical sector format incorporated therein, with the capability to function with a sector-formatted memory having a physical sector format different than the predetermined logical sector format. The present invention receives an I/O request (e.g., read or write) then examines the relative difference between the logical sectors associated with the I/O request and the physical sectors associated with the sector-formatted memory. After the examination, the present invention processes the I/O request in accordance with the relative difference between the logical sectors and the physical sectors in order to properly complete the I/O request and preserve the integrity of stored data.

BRIEF DESCRIPTION OF THE DRAWINGS

The aspects, features and advantages of the present invention will be more readily understood from the following detailed description when read in conjunction with the accompanying drawings, in which:

FIG. 1 is a table illustrating efficiency for prior art use of 512 and 180 byte sector format disks.

FIG. 4b-1 and 4b-2 are flow charts illustrating the non-caching write operation incorporating an exemplary embodiment of another aspect of the present invention.

FIG. 5a-1 and 5b-2 are flow charts illustrating a typical caching read operation that does not use the present invention.

FIG. 5b-1 and 5b-2 are flow charts illustrating the caching read operation incorporating an exemplary embodiment of another aspect of the present invention.

FIGS. 6b-1, 6b-2, 6b-3, and 6c-1 and 6c-2 are flow charts illustrating the caching write operation incorporating an exemplary embodiment of another aspect of the present invention.

DETAILED DESCRIPTION

Overview

The present invention involves providing a system (e.g., a Unisys A series computer) which accesses data from a sector-formatted memory (e.g., disks) with the flexibility to access data stored in various sector formats (e.g., 180 bytes/sector, 512 bytes/sector, 720 bytes/sector). This flexibility is provided such that the system is not limited to a predetermined sector format, especially if the predetermined sector format is is inefficient and cost prohibitive. This feature can effectively increase the usable capacity of a disk drive by approximately 15–20%.

An exemplary embodiment of the present invention is implemented on the system architecture shown in FIG. 2 (described in detail below). The present invention functions in conjunction with two operations performed by the processors shown in FIG. 2: 1) read operation (shown in FIG. 3b), and 2) write operation (shown in FIG. 4b). The present invention also functions when caching is activated: 1) caching read operation (shown in Figure 5b) and 2) caching write operation (shown in FIGS. 6b and 6c). It should be noted that the caching may be performed globally or locally within a disk device.

In order to provide the flexibility of functioning with various sector formats, the present invention employs physical sectors of most any size and modifies the input and output of data thereto to conform to predetermined logical sectors (180 bytes each in the present invention). In the exemplary embodiment of the present invention, a logical sector size of 180 bytes is used because the A series computer systems are currently designed to work with this specification.

In particular, for a read operation starting in the middle of a physical sector, processors (e.g., IOU 208 and CMU 210) causes the beginning bytes not requested by the user (i.e., physical sector data preceding the first logical sector) to be discarded and the user requested data to be stored in a user buffer.

For a write operation, a combination read/modify/write cycle is performed. Because data is written to disks in blocks equal to the physical sector size, when the system requests a write to a logical sector, the physical sector is read, modified according to the write request to the logical sector and then written (generally in parts) as a complete physical sector back to the disk. It should be noted that a buffer is maintained for holding the data which is read and subsequently modified prior to writing it back to the disk.

In the exemplary embodiment of the present invention, as mentioned, the computer system was originally designed to operate with 180 byte sectors.

However, once the present invention is installed, although a non-180 byte sector formatted disk may be being used, most of the computer system is unaware of this fact. In fact, except for the intervention by the is present invention, the computer system continues to operate as if a 180 byte sector format disk is being accessed.

Figure 7:
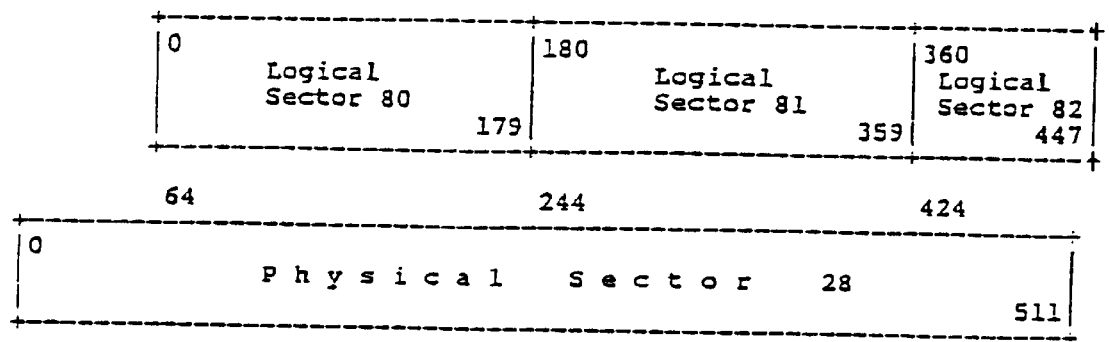
FIG. 7 is a diagram comparing one physical sector of 512 bytes to several logical sectors of 180 bytes.

An important function of the present invention involves determining where a requested address (i.e., for purposes of a read or write) is relative to physical sector boundaries. For example, as shown in FIG. 7, logical sector 80 may extend from byte 0 to byte 179; However, the corresponding bytes in physical sector 28 extend from byte 64 to byte 244. Knowing where a requested address is relative to physical sector boundaries, the present invention provide the computer system with the ability to function with several different byte sector formats (i.e., the most efficient byte sector format).

DETAILED DESCRIPTION OF EXEMPLARY EMBODIMENT

As mentioned above, FIG. 2 shows a high level system architecture for a system on which the present invention can be implemented. A similar system for performing I/O operations is shown in U.S. Pat. No. 5,313,584 issued to Tickner et al. which is herein incorporated by reference.

Figure 2:
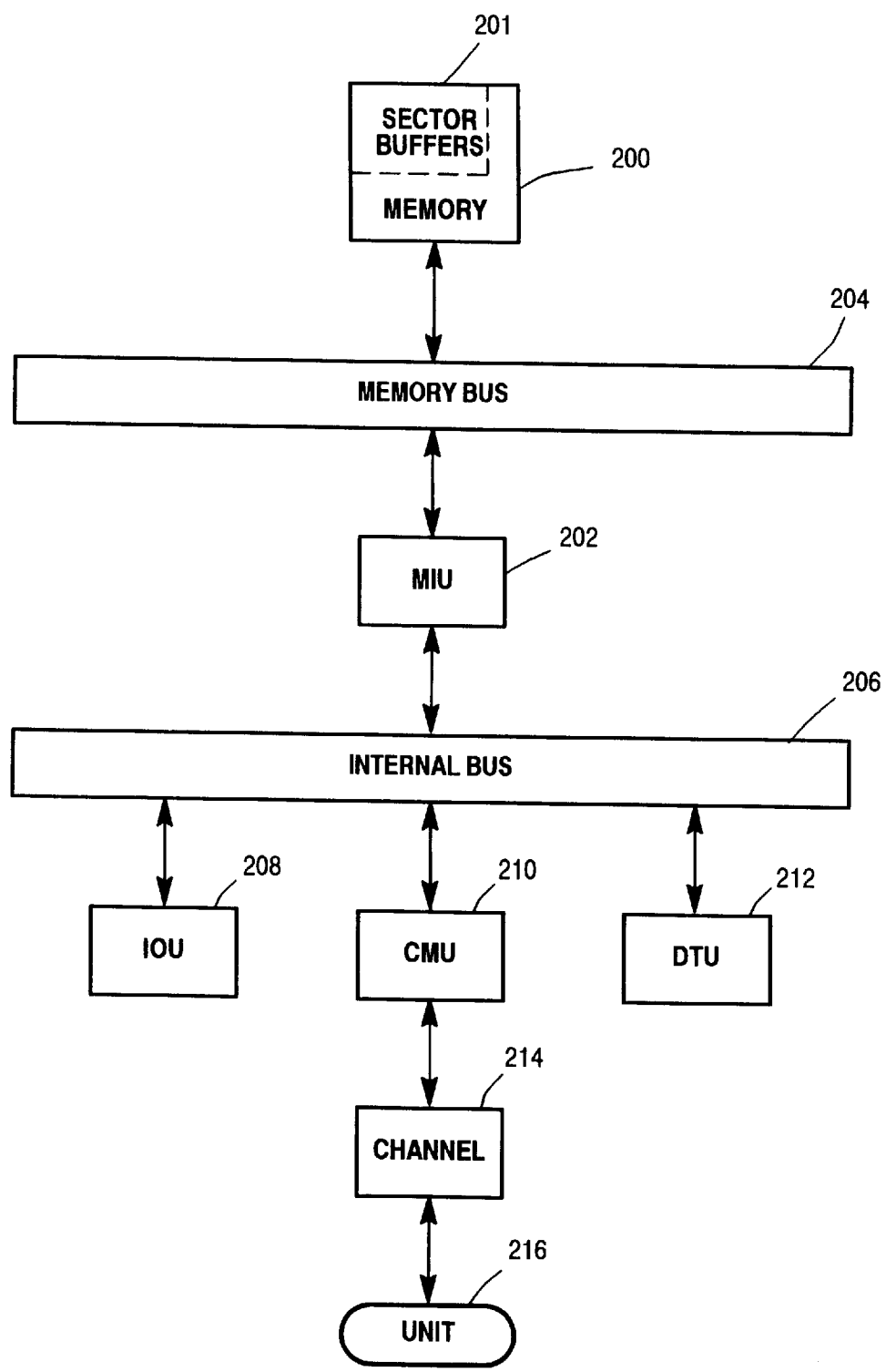
FIG. 2 is a high level block diagram of an architecture suitable for use with the present invention.

In FIG. 2, a main memory 200 is coupled to a memory interface unit (MIU) 202 via memory bus 204. MIU 202 is coupled to several other processors via an internal bus 206. The other processors include a input/output unit (IOU) 208, a channel management unit (CMU) 210, and a data transfer unit (DTU) 212. The CMU 210 is further connected to I/O channel 214 which leads to peripheral unit 216. It should be noted that in addition to IOU 208 which is an input/output unit, the entire module including MIU 202, IOU 208 CMU 210 and DTU 212 is known as an input/output module (IOM).

The MIU 202 handles the buffering and issuing of addresses to main memory 200 for store and fetch operations. MIU 202 also handles translation between logical and physical addresses and arbitration of a plurality of requests from memory 200. MIU 202 provides memory interface between the above mentioned processors and units and main memory 200. For instance, if a processor/unit needs to store data in memory, first, MIU 202 will request the data in the intended destination addresses; next, MIU 202 receives the data needed to be stored by the processor/unit which, in turn, will modify or replace the data retrieved from main memory 200; finally, MIU 202 writes the set of modified/replaced data back to the intended destination address in main memory 200.

The CMU 210 manages data movement between the main memory 200 and any peripheral I/O units 216 (e.g. disks and tape drives) which may be coupled to the processing system. The CMU 212 communicates with external channels through a channel service bus (not shown).

The DTU 212 performs block data transfer from one location in main memory 200 to another upon the request of an IOU 208. DTU 212 is also used for disk caching.

IOU 208 performs high level I/O functions such as the scheduling of I/O jobs, the selection of data paths over which I/O jobs are performed, the gathering of job statistics and the management of I/O devices and of a disk cache. It is the IOU 208 which knows whether a disk device is formatted with 180 bytes sectors or non-180 bytes sectors (e.g., 512 bytes or 720 bytes). Additionally, it is IOU 208 which communicates with the operating system of the computer system for receiving initialization and other high level instructions.

To illustrate how the present invention operates, the flow of execution for two different operations (read and write) under two sets of conditions (non-caching and caching) is compared with the same operations not employing the present invention.

NON-CACHING READ OPERATION

Prior Art

Figure 3A:
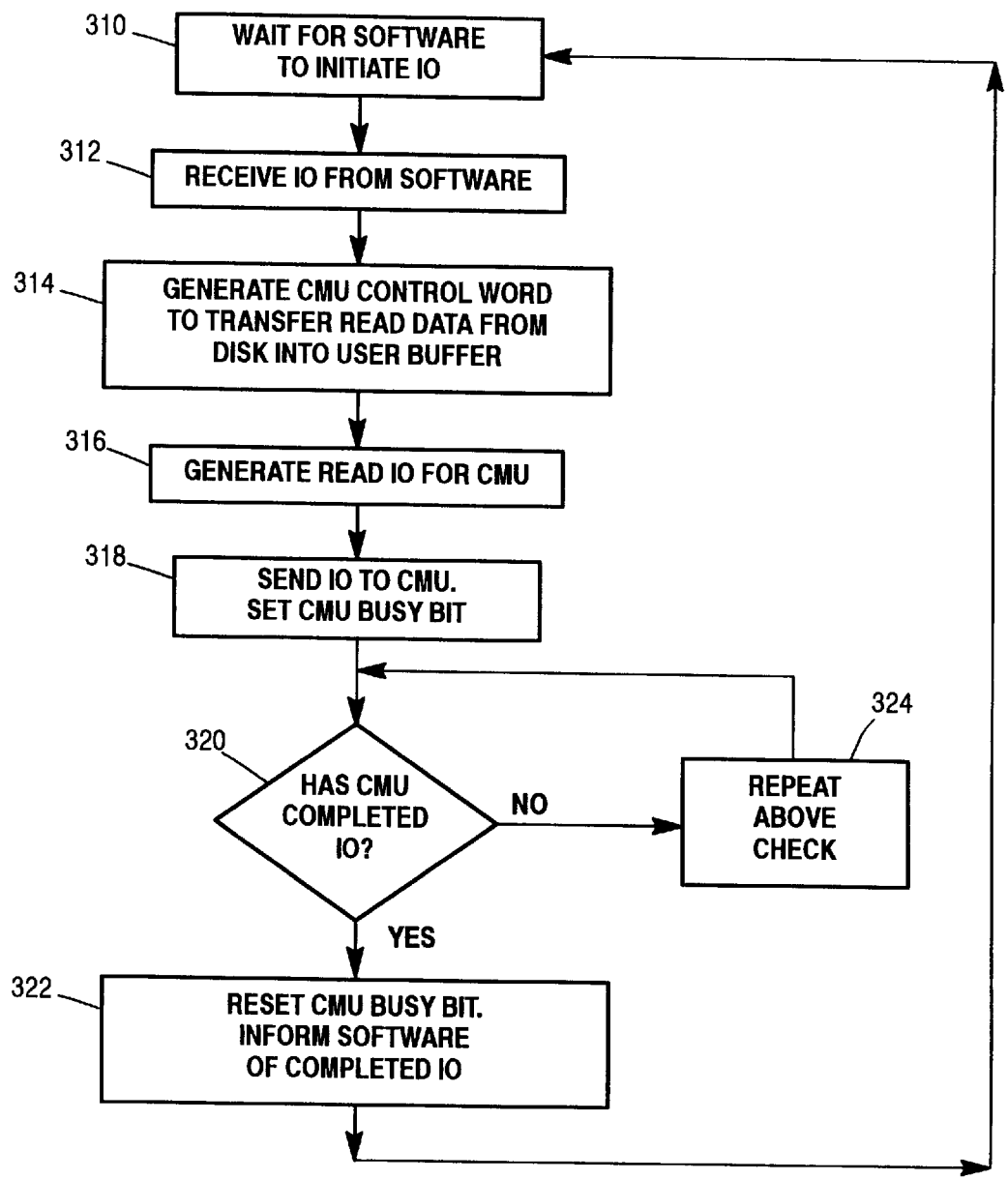
FIG. 3a is a flow chart illustrating a typical non-caching read operation that does not use the present invention.

Prior to the implementing the present invention, a non-caching read operation using a 180 byte sector-formatted disk would execute the following sequence of steps as illustrated in the flowchart of FIG. 3a.

At step 310, the system waits for the operating system to initiate an I/O request. This request is typically generated by a device other than the processors shown in FIG. 2. At step 312, the system (e.g., IOU 208) receives the I/O request from the operating system. Upon receipt, the IOU 208 generates a CMU control word to transfer read data from disk into a user buffer, step 314. At step 316, the IOU generates a read I/O for CMU 210. The read I/O is sent to CMU 210, at step 318, and a CMU Busy bit is set. Next, IOU 208 loops with a check to see if CMU 210 has completed the read I/O, step 320 and 324. When the check is positive, at step 322, the CMU Busy bit is reset and the IOU 208 informs the operating system or requesting device that the read I/O is complete.

With present invention

Figure 3B:
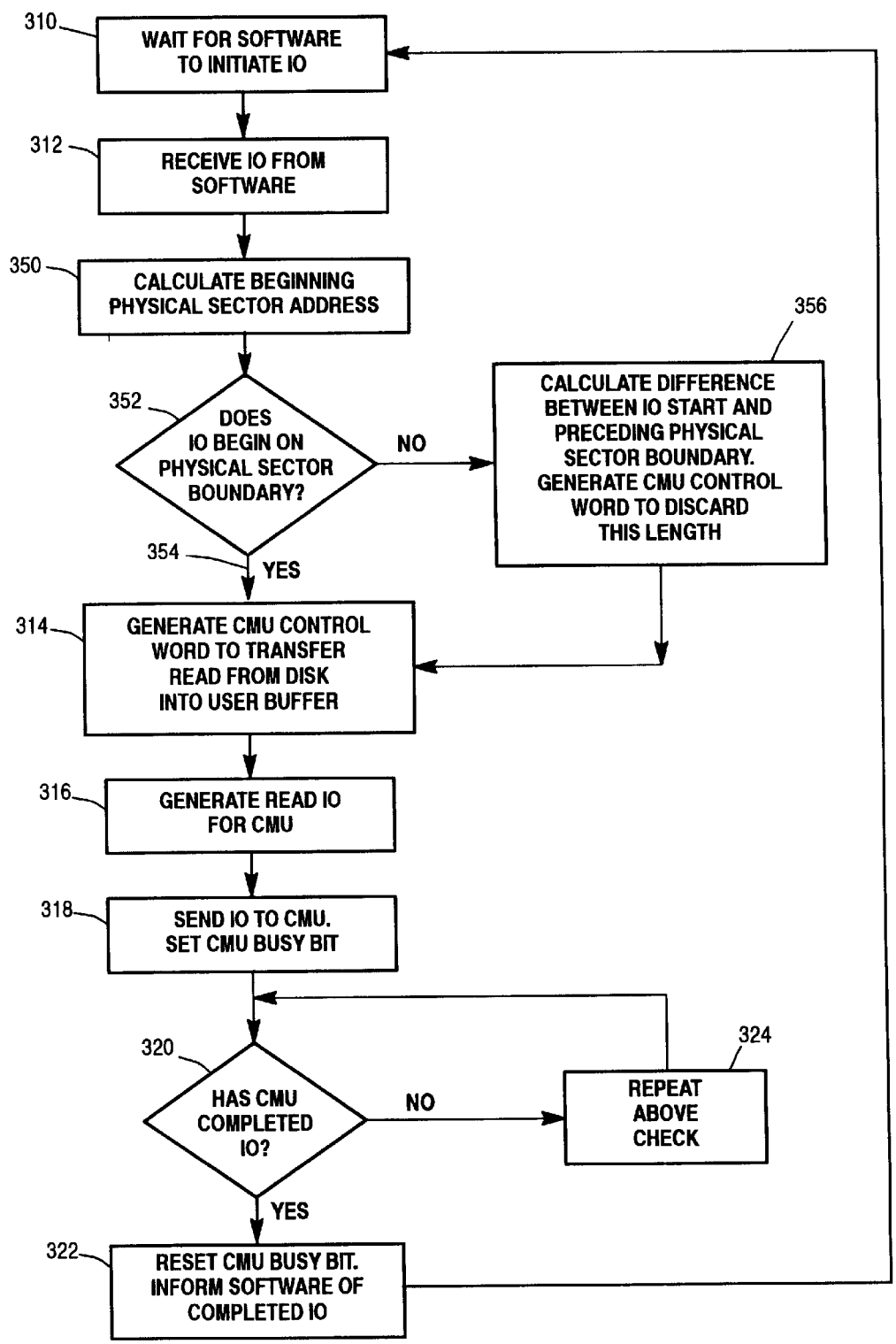
FIG. 3b is a flow chart illustrating the non-caching read operation incorporating an exemplary embodiment of one aspect of the present invention.

After installing the present invention, a read using the non-180 byte sector format executes the following sequence of steps as illustrated in the flowchart of FIG. 3b.

Steps 310 and 312 are the same, however, at this point, the sequence differs.

At step 350, the beginning Physical Sector Address is calculated. At step 352, it is determined whether the I/O request begins on a Physical Sector boundary? If yes, the process proceeds to step 314. Otherwise, at step 356, it calculates a difference between the start address of the I/O request and the preceding Physical Sector boundary and generate a CMU control word to discard the data contained in the length of the difference.

At this point, the sequence returns to the typical sequence at step 314.

As seen by the sequence of steps, because data read from the disk begins from a physical sector boundary, the data from that boundary to the requested address is discarded.

NON-CACHING WRITE OPERATION

Prior Art

Figure 4A:
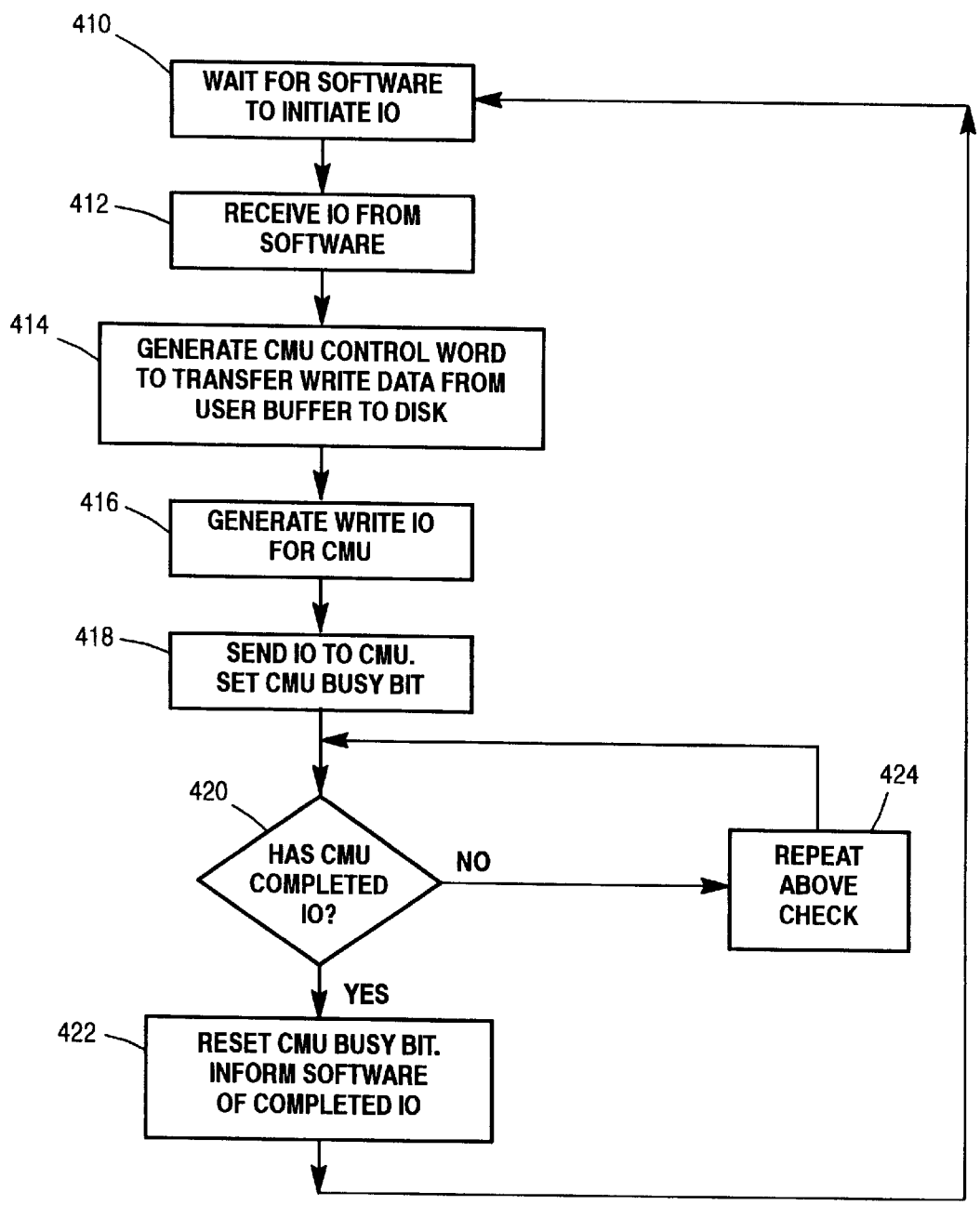
FIG. 4a is a flow chart illustrating a typical non-caching write operation that does not use the present invention.

Prior to the implementing the present invention, a typical write operation using the 180 byte sector format would execute the following sequence as illustrated in the flowchart of FIG. 4a.

Again, as with the read, the system waits for operating system to initiate I/O and waits to receive the I/O from operating system.

At step 414, the IOU 208 generates a CMU control word to transfer write data from a user buffer to disk. The user buffer is allocated in main memory 200 by the operating system. Although not shown, the operating system communicates with IOU 208 which, in turn, communicates with the other processors in the IOM.

Next, IOU 208 generates a write I/O for CMU 210, at step 416. At step 418, the write I/O is sent to CMU 210 and the CMU Busy bit is set. Next, a check to see if CMU 210 has completed the write I/O is looped on, step 420 and 424. When the check is positive, at step 422, the CMU Busy bit is reset and the operating system is informed that the write I/O is complete.

With present invention

Figures 1, 4B:
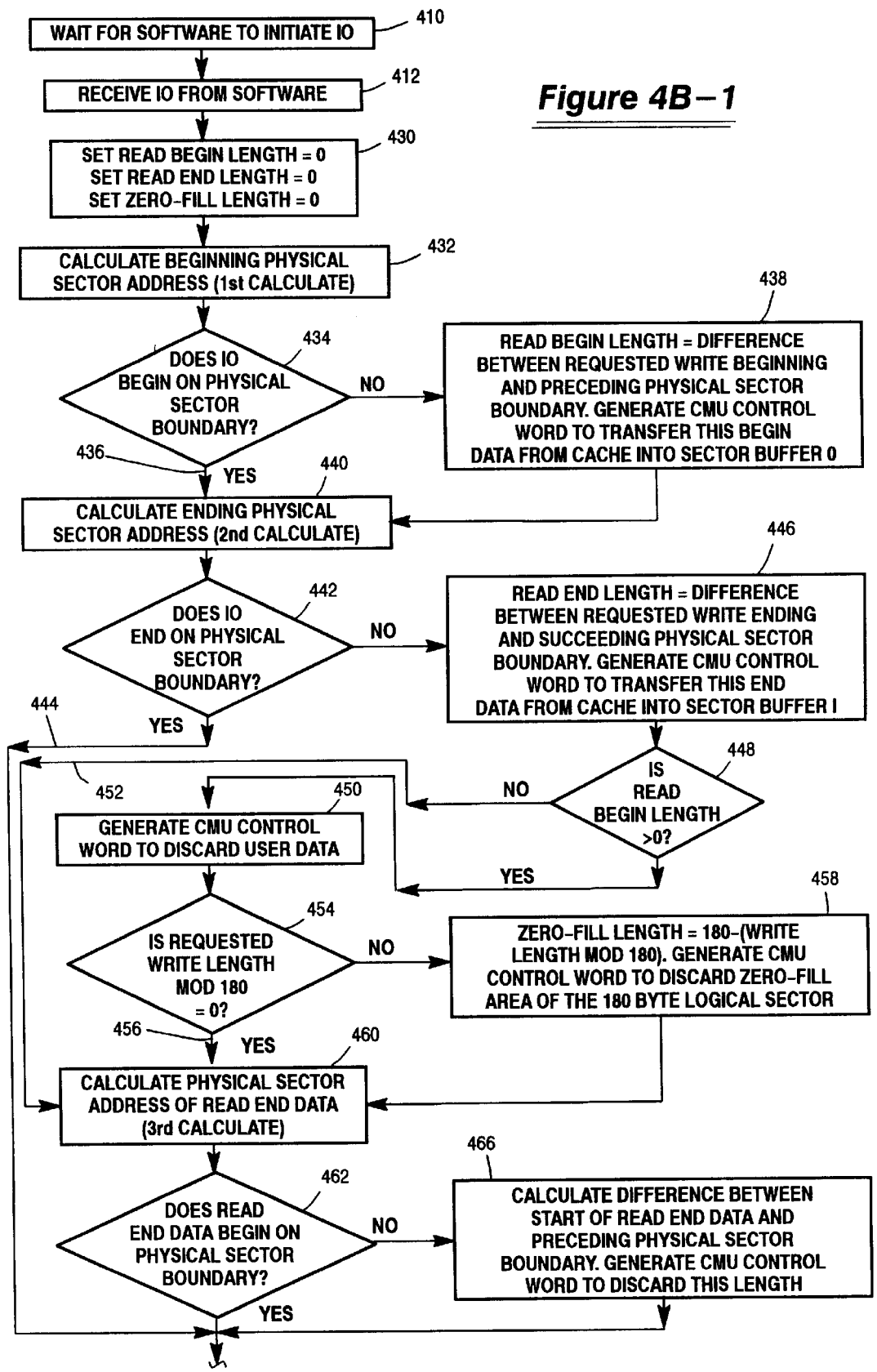
Figures 2, 4B:
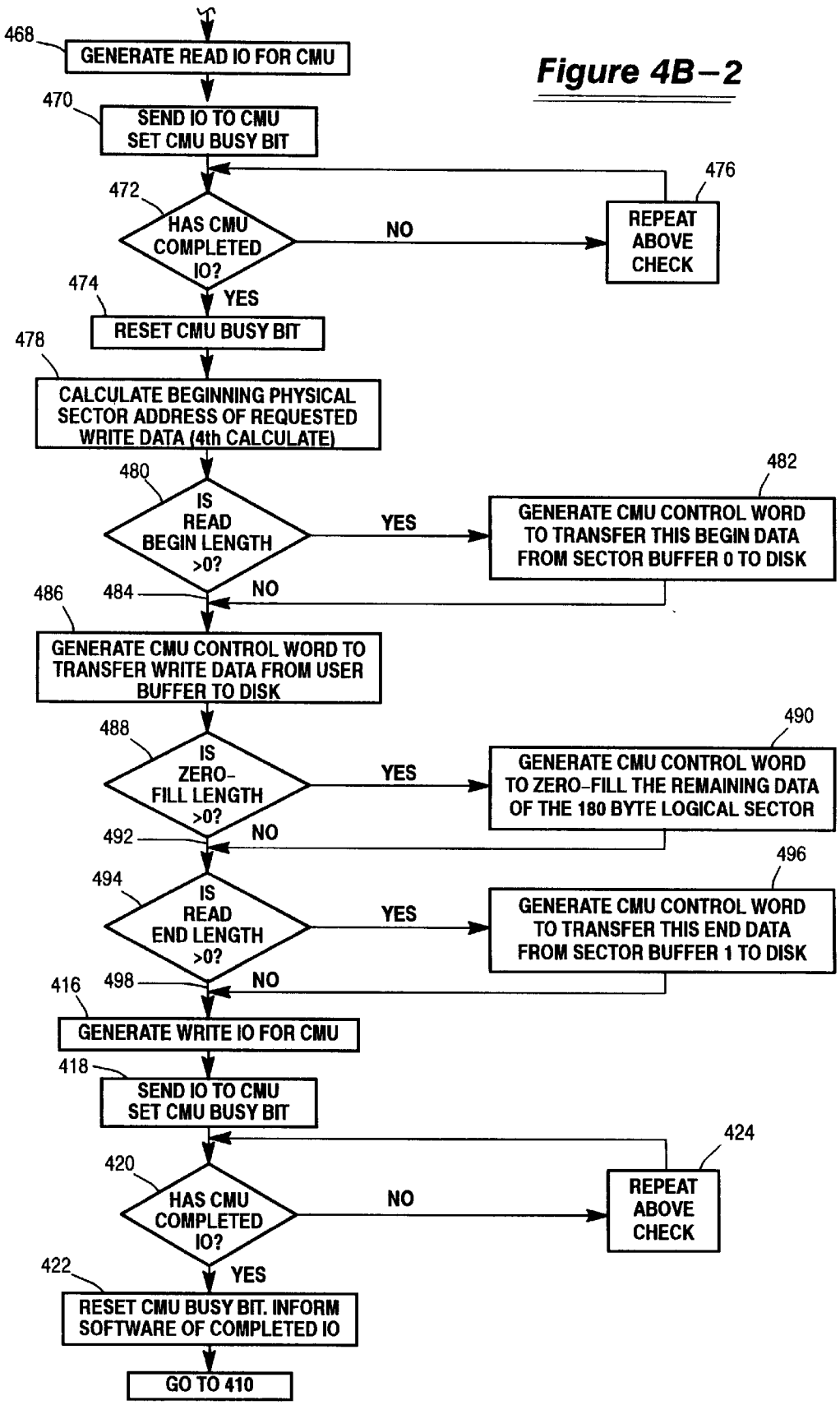

After installing the present invention, a write operation using the non-180 byte sector format executes the following sequence of steps as illustrated in the flowchart of FIG. 4b.

It should be noted that for write operations, in the exemplary embodiment of the present invention, a sector 201 for holding physical sector data during the read/modify/write operation is established in main memory 200. One buffer is established for each disk which is designated as a non-180 byte sector disk. The total amount of memory needed to support 500 non-180 byte sector disks, each with a maximum sector size of 720 bytes, is 120K system words. In the exemplary embodiment, the buffer or sector buffer is provided with two parts—sector buffer 0 and sector buffer 1—in order to conveniently hold data from the physical sector on either side of a requested write I/O to a logical sector.

As shown in FIG. 4b, the sequence begins to differ at step 414.

At step 430, the variables Read Begin Length, Read End Length, and Zero-fill Length are set to 0.

From step 432 to step 438, the beginning Physical Sector Address is determined. If the I/O does not begin at the physical sector address then Read Begin Length=difference between requested write beginning and preceding Physical Sector boundary. And, IOU 208 generates a CMU control word to transfer this beginning data into Sector Buffer 0.

From step 440 to step 446, a similar group of steps is performed except this time it is for the end of the physical sector address. The ending Physical Sector Address is determined. If the I/O does not end on Physical Sector boundary then Read End Length=difference between requested write ending and succeeding Physical Sector boundary. And, IOU 208 generates a CMU control word to transfer this end data into Sector Buffer 1.

Steps 448 and 452 are performed to discard data in the user requested write area when Read Begin Length>0.

From step 454 to step 458, using modulo arithmetic, it is determined if a zero-fill is needed and if so, the data in zero-fill area is discard.

From step 460 to step 466, if the Physical Sector Address of read end data does not begin on Physical Sector boundary, then the user data contained in the area defined by the difference is discarded.

From step 468 to step 476, the commands generated for CMU 210 from the calculations performed in is previous steps are send to the CMU for execution of the read portion of the read/modify/write cycle.

From step 478 to step 498, calculations are performed to determine how much, if any, data from the sector buffer 0 should be written to disk, how much user data should be written to the disk, how much zero-fill is required and how much, if any, data from the sector buffer 1 should be written to the disk.

At this point, the sequence returns to the typical sequence beginning at step 416.

The present invention, in addition to operating with basic read and write instructions, also operates in conjunction with caching. The flowcharts for comparing caching read and caching write operations with and without the present invention are shown in FIGS. 5a, 5b, 6a and 6b/6c.

CACHING READ OPERATION

Without using the present invention

Figures 1, 5A:
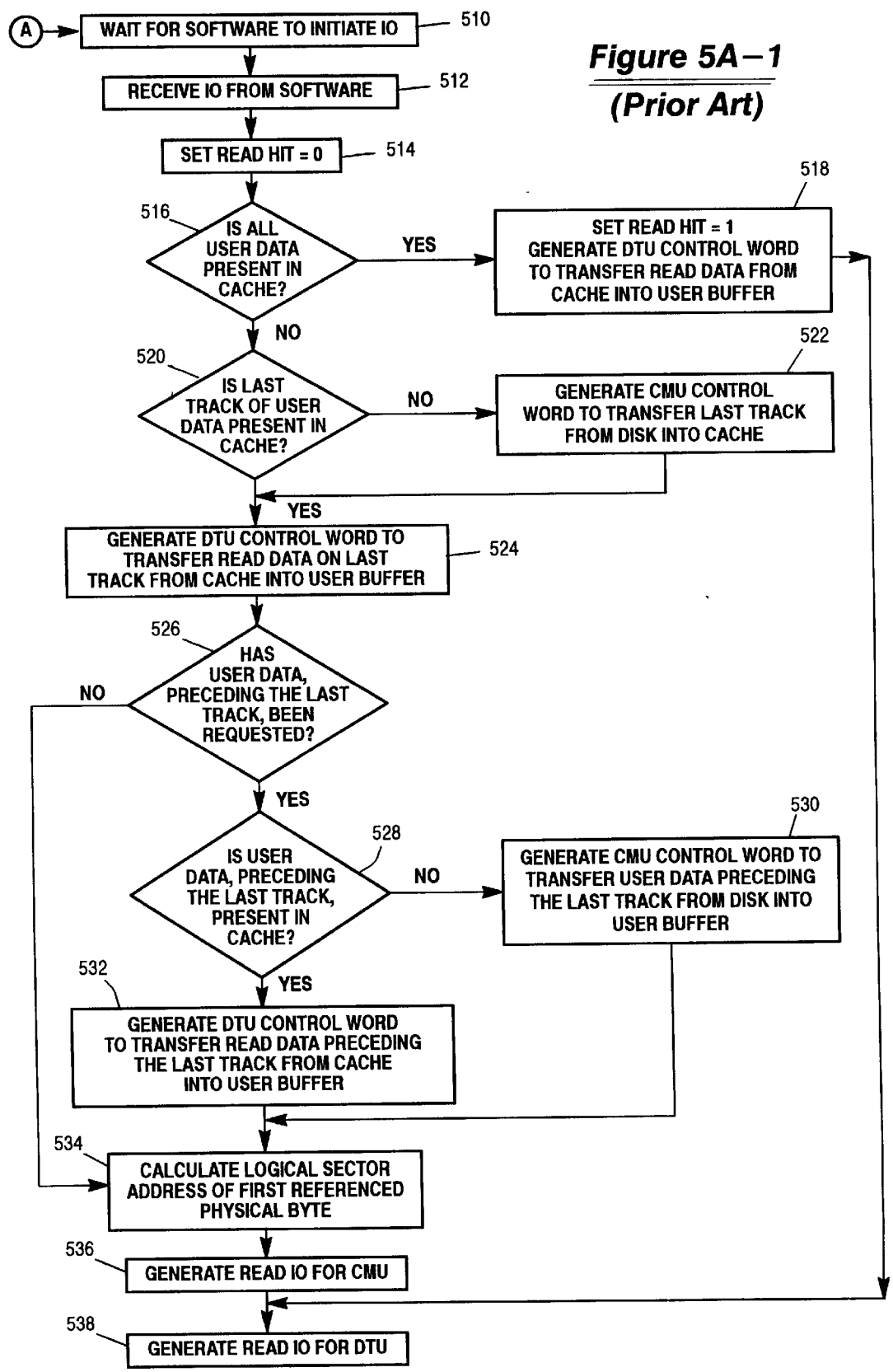
Figures 2, 5A:
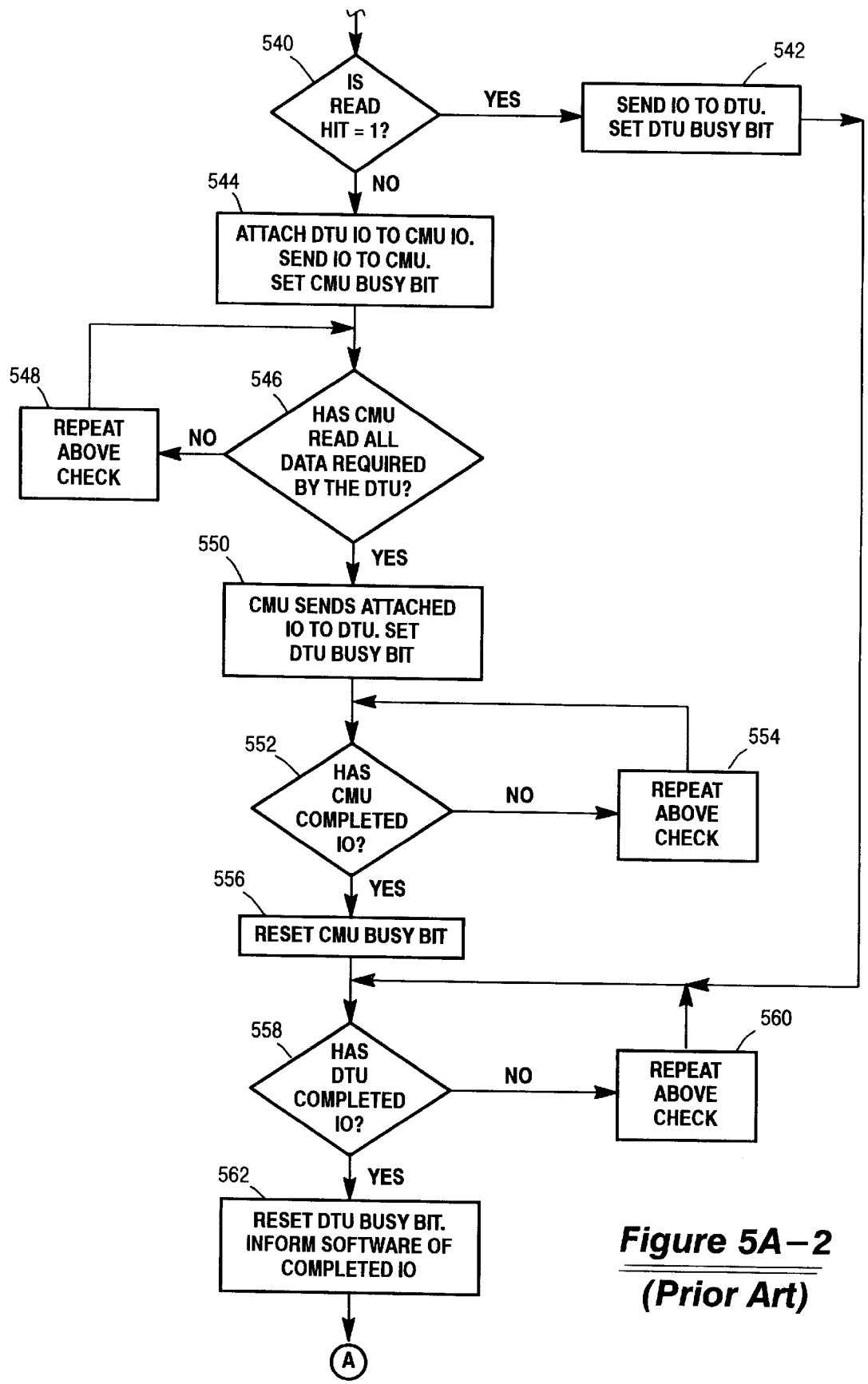

Prior to implementing the present invention, a caching read operation using a 180 byte sector-formatted disk would execute the following sequence of steps as illustrated in the flowchart of FIG. 5a.

As in the non-caching operation discussed above, the system waits for the operating system to initiate an I/O read request. When this request is received in step 512, a READ HIT bit is reset to zero, step 514. If all of the requested user data is found in the cache in step 516, the process moves to step 518, wherein the READ HIT bit is set to one, and a DTU 212 control word is formed to transfer the requested data from the cache to the user buffer and the process skips to step 538.

If all of the requested user data was not found in the cache in step 516, another check of the cache is made to determine whether the last track of user data is present in the cache, step 520. Steps 520 and 522 ensure that the last track of user data is available in the cache before moving on to step 524.

At step 524, a DTU 200 control word is generated to transfer the requested data on the last track from the cache into the user buffer. Then, process step 526 determines whether any data preceding the last track was requested. If not, the process skips to step 534. If user data preceding the last track was requested, process step 528 is entered. Process steps 528 to 532 ensure that the user data preceding the last track is moved, either from the cache or the disk, to the user buffer. At step 534, the logical sector address of the first referenced physical byte is calculated.

Process step 536 generates a read I/O request for the CMU 210, while step 538 generates a read I/O request for the DTU 212. These requests are not sent yet, they are only prepared. Step 540 checks the READ HIT bit to determine whether the requested data was entirely found within the cache. If so, the DTU request generated in step 538 is sent to the DTU 212, the DTU BUSY bit is set, and the process skips to step 558.

If the check in step 540 shows that the requested data was not entirely in the cache, the DTU request generated in step 538 is attached to the CMU request generated in step 536, the resulting I/O request is sent to the CMU 210, and the CMU BUSY bit is set.

Steps 546 and 548 wait for the CMU to complete reading the data required by the DTU request. The CMU 210, in step 550, then sends the I/O request to the DTU 212 and sets the DTU BUSY bit. Steps 552 to 556 wait for the CMU to complete this I/O request, resetting the CMU BUSY bit afterwards. The process then waits for the DTU to complete servicing the DTU request in steps 558 and 560. When the DTU is finished, the DTU BUSY bit is reset and the requesting software is informed that the I/O request has been completed, step 562.

With the present invention

Figures 1, 5B:
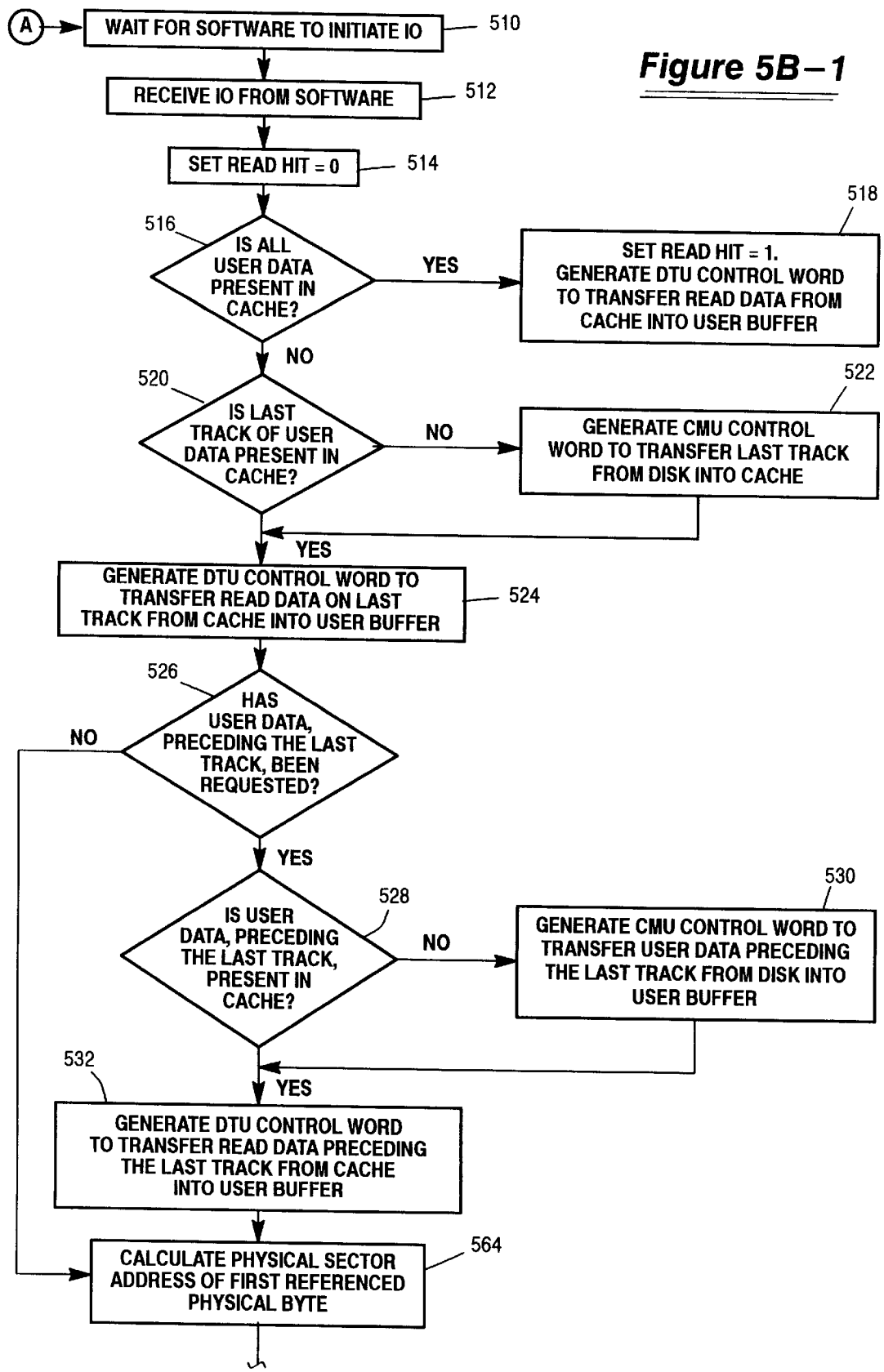
Figures 2, 5B:
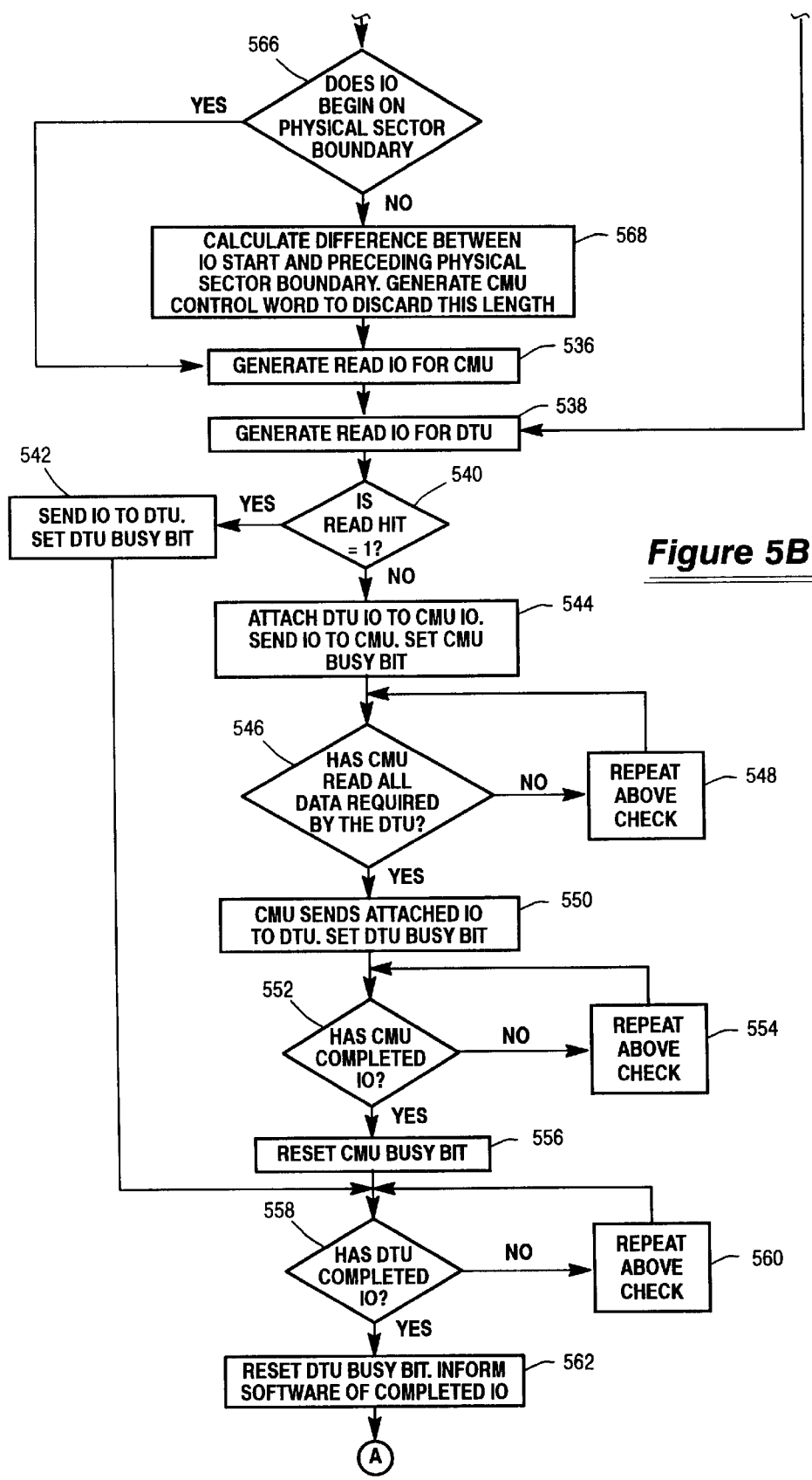

After installing the present invention, a read using the same sector formats on the same caching system executes the following sequence of steps as illustrated in the flowchart of Figure 5b.

The same steps 510–532 are followed as if the system of the present invention were not installed. Step 564 replaces step 534, with calculating the physical sector address of the first referenced physical byte. The process then, in step 566, checks to determine whether the requested data begins on a physical sector boundary. If so, the process skips to step 536.

If the requested data does not begin on a sector boundary, calculations are made in step 568 to generate a value indicating difference between the preceding physical boundary and the logical I/O boundary of the requested data. A CMU control word is generated that will discard this length of data. The process then moves to step 536, where operation is identical to that shown in FIG. 5a.

CACHING WRITE OPERATION

Without using the present invention

Figure 6A:
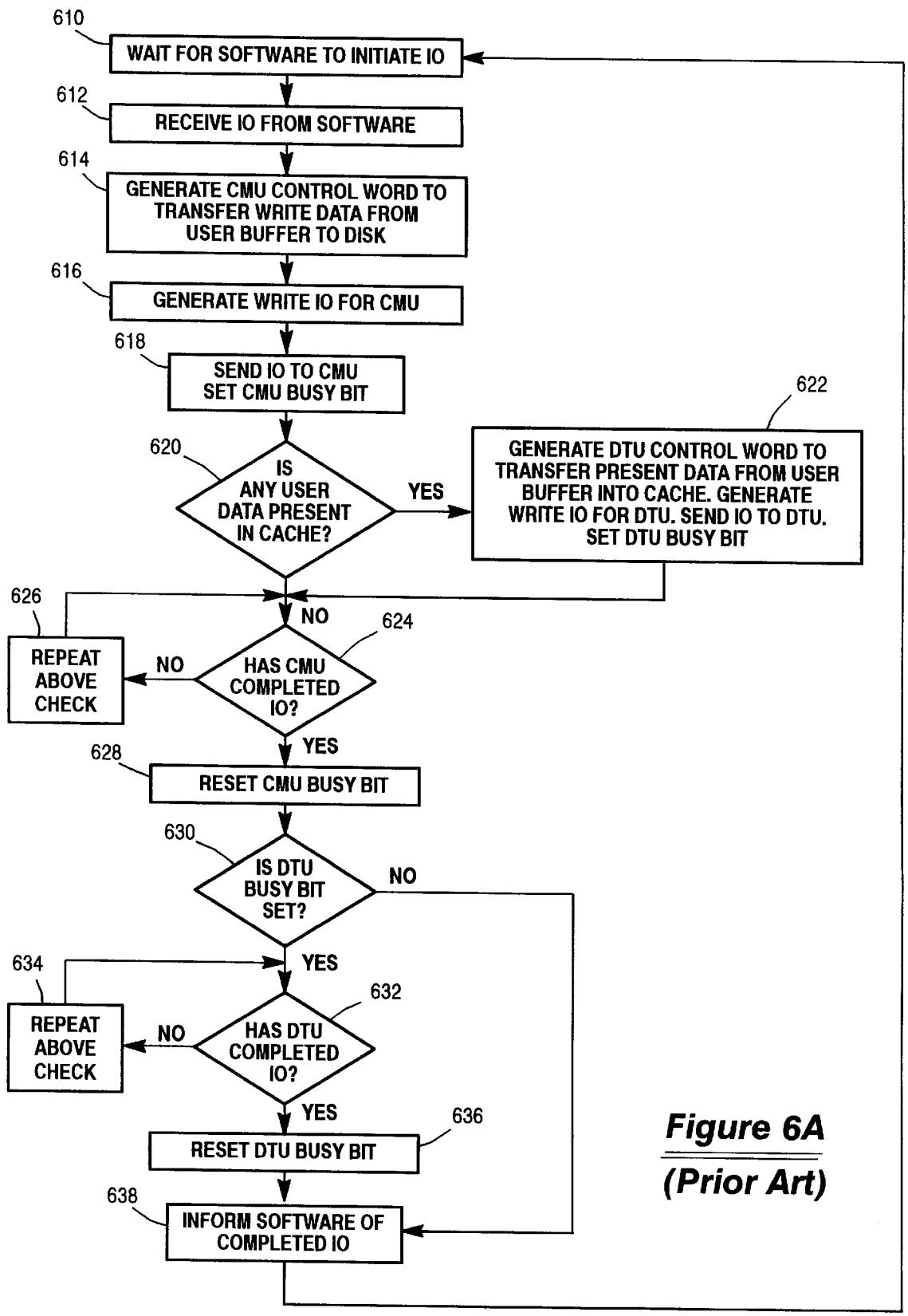
FIG. 6a is a flow chart illustrating a typical caching write operation that does not use the present invention.
Figures 1, 6B:
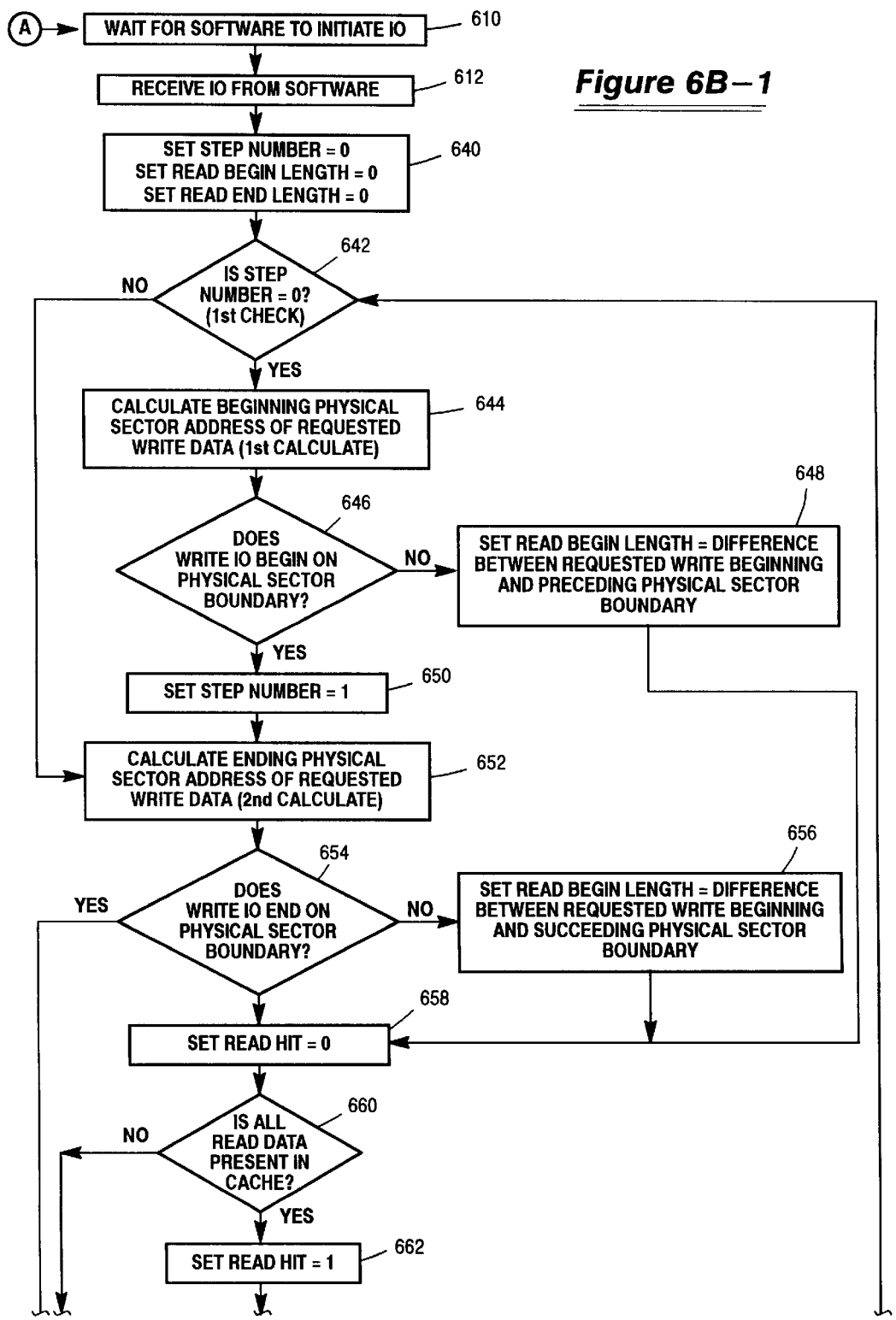
Figures 2, 6B:
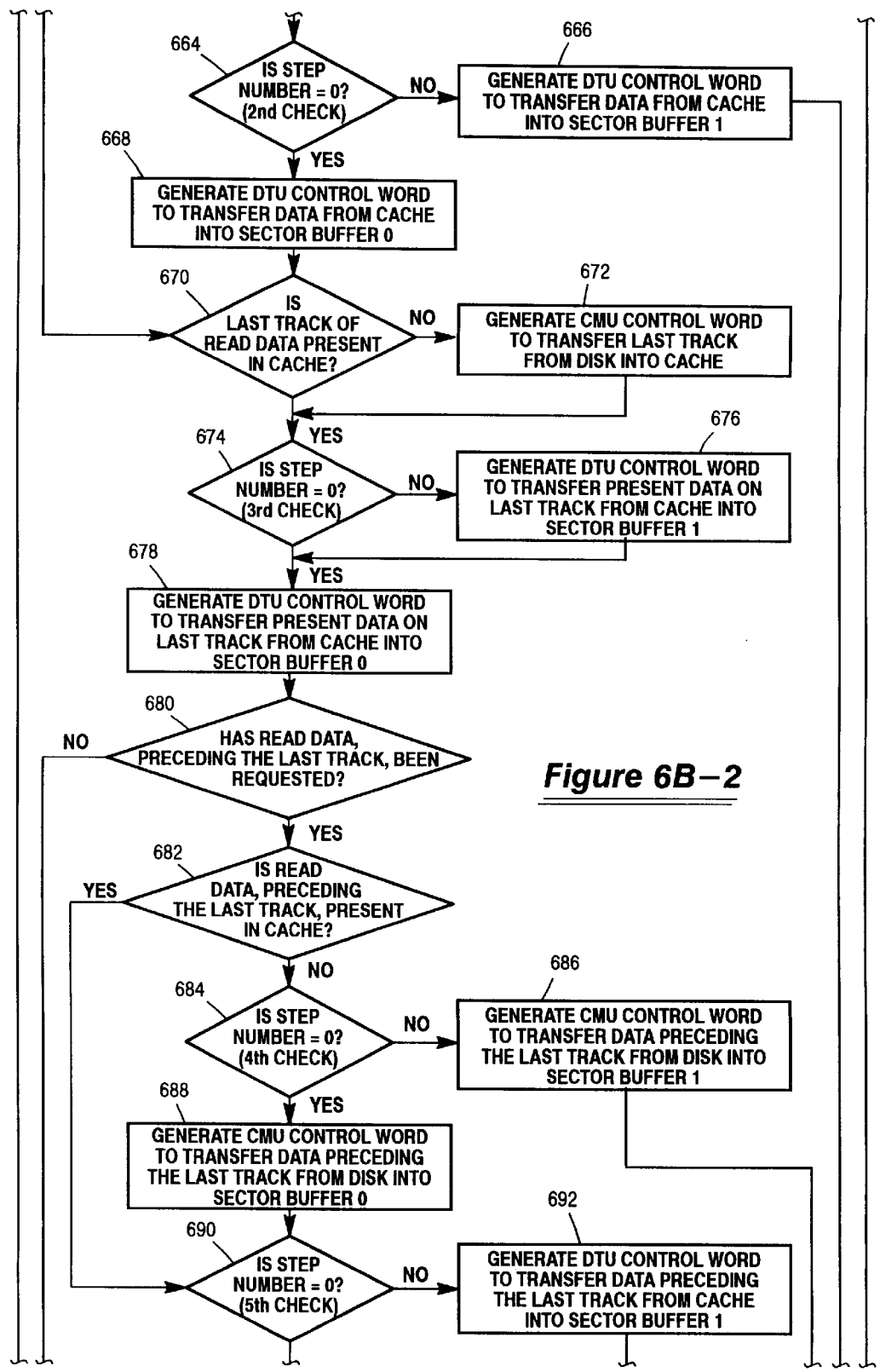
Figures 3, 6B:
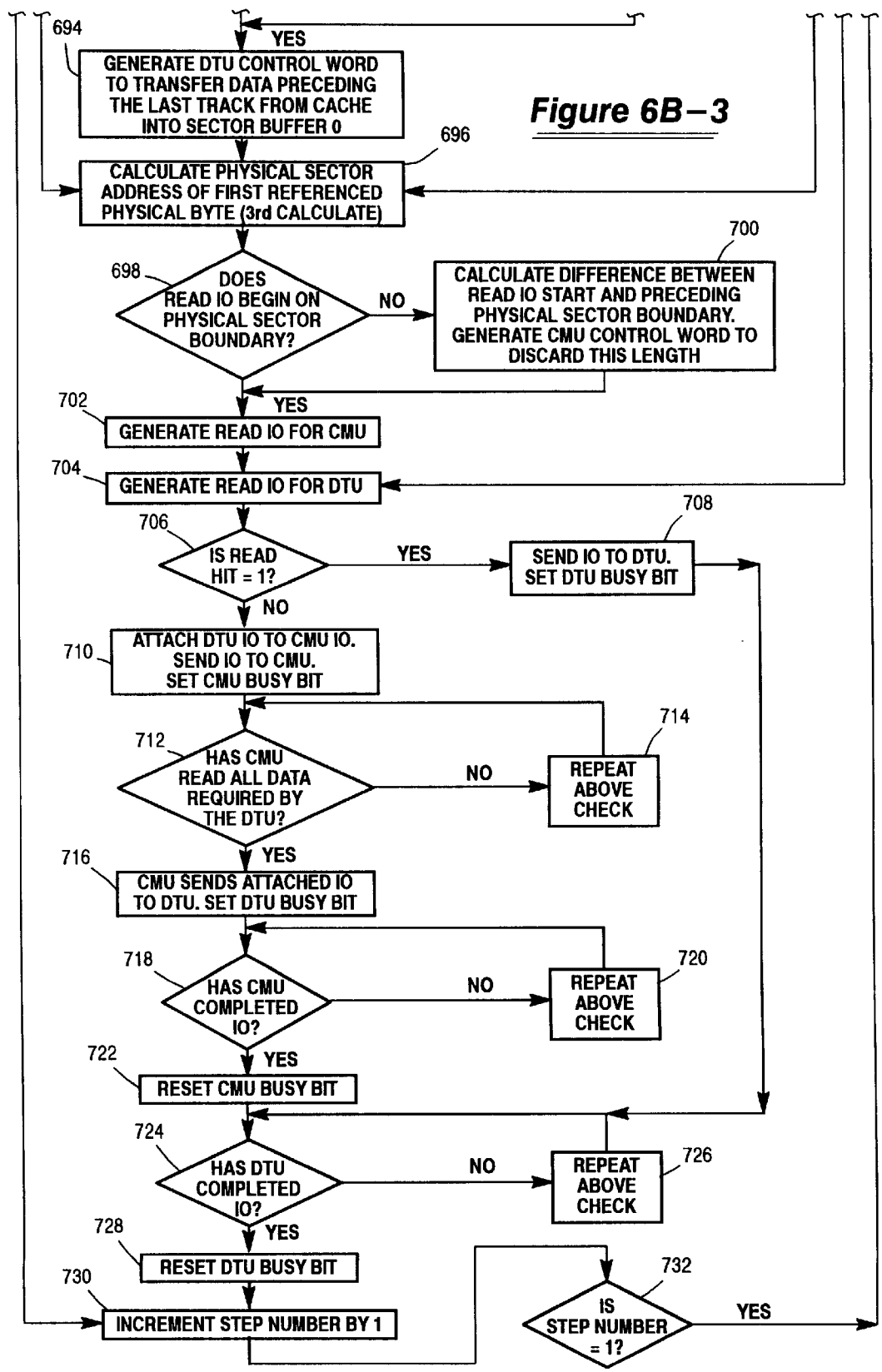
Figures 1, 6C:
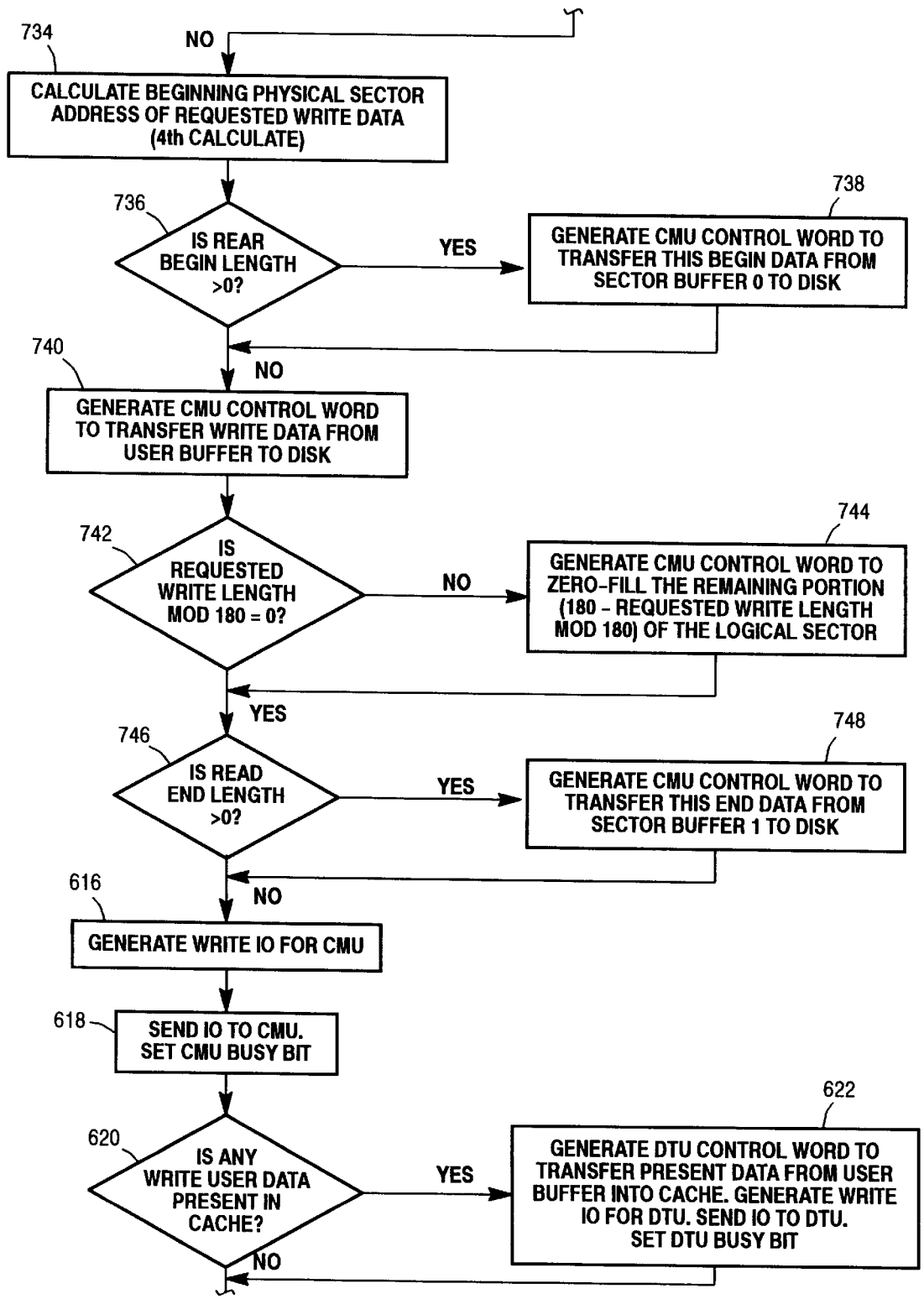
Figures 2, 6C:
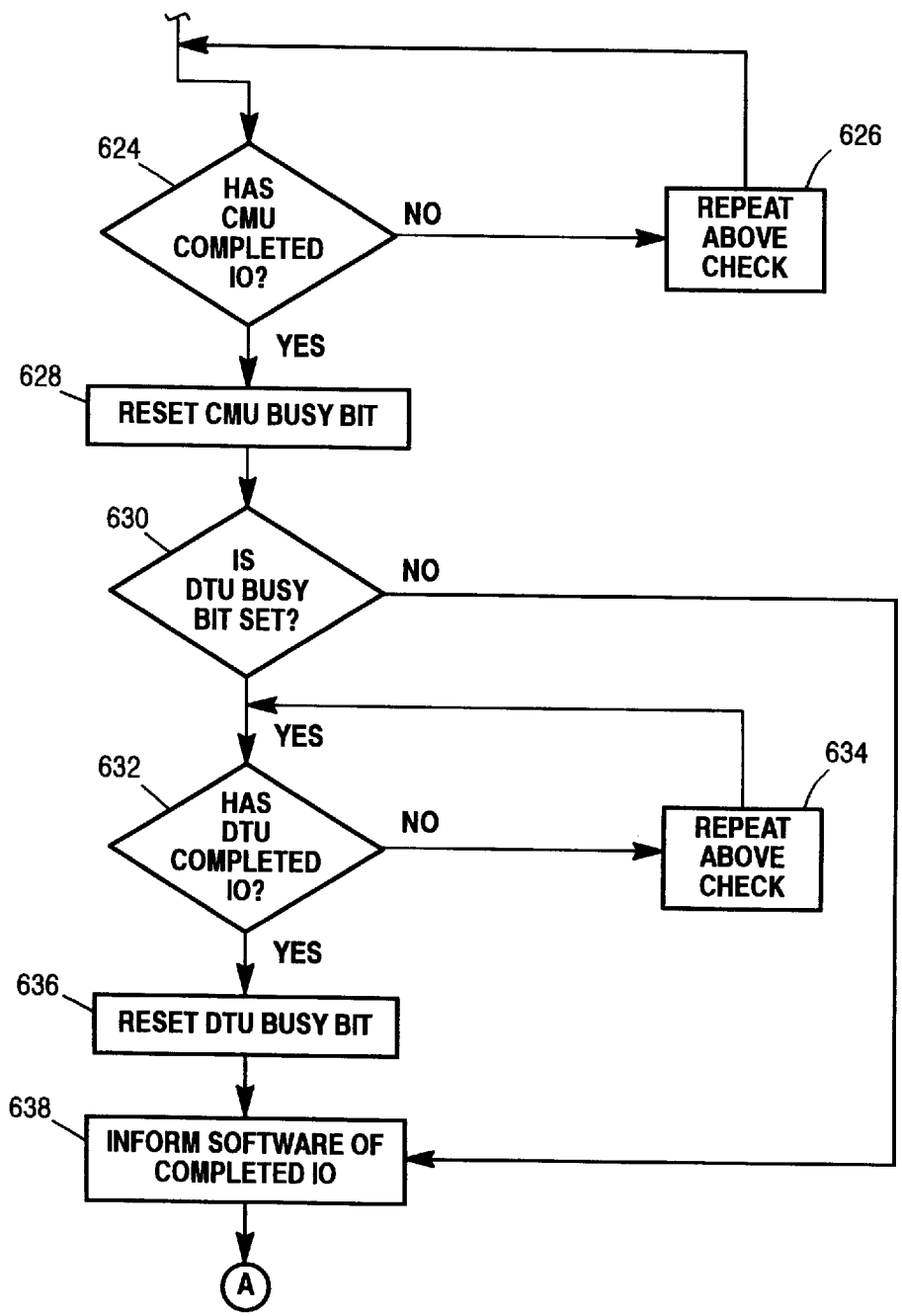

Prior to implementing the present invention, a typical caching write operation using the same sector-formatted disk as previously discussed would execute the following sequence of steps as illustrated in FIG. 6a.

Steps 610 and 612 include the system waiting for software to initiate an I/O request and receiving such a request. In step 614, a CMU control word is generated to transfer the data to be written from the user buffer to the disk. In step 616, an I/O request for the CMU 210 is generated. This request is then sent to the CMU 210, and the CMU BUSY bit is set.

Then, in step 620, a check is made of the cache to determine whether any of the data to be written was present in the cache. If so, it will need to be updated, and this occurs in step 622, which generates the commands needed to transfer the updated data from the user buffer to the cache.

The process then waits for the CMU to complete the I/O request, steps 624 and 626. When the CMU is finished, the CMU BUSY bit is reset in step 628 and the process moves to step 630. At this point, if the DTU BUSY bit is set, the process will wait for the DTU 212 to complete updating the cache, steps 632 and 634. The process then resets the DTU BUSY bit in step 636, and moves to step 638 to inform the requesting software that the I/O request has been completed.

If, in step 630, the DTU BUSY bit was not set, then there is no need to wait for a cache update because it is not being updated. The process skips directly to the last step, 638, which completes the I/O process.

With the present invention

The process steps of waiting for an I/O request from software, step 610, and receiving an I/O request from software, step 612, are the same as before. However, once such a request is received, the process is different, with step 640 initializing system variables STEP NUMBER, READ BEGIN LENGTH and READ END LENGTH all to the value of zero. STEP NUMBER is a counter value used within the process. READ BEGIN LENGTH and READ END LENGTH are values that represent the distance, in memory terms, between the requested write area and the beginning and ending sector boundaries, respectively.

The next step, 642, is a decisional step to skip directly to step 652 if the STEP NUMBER is not zero. If the STEP NUMBER is zero, the process then calculates the beginning sector address of the requested write data in step 644. Step 646 then checks to see if the write request begins on a physical sector boundary. If the request does not begin on a physical boundary, the process moves to step 648, where the READ BEGIN LENGTH value is set to the difference between the beginning of the physical sector and the beginning of the addresses to be written to within the physical sector. From step 648, the process skips to step 658.

If, in step 646, the write request does in fact begin on a physical boundary, no READ BEGIN LENGTH is needed and the process moves to step 650, where STEP NUMBER is set to 1. The process then calculates the ending physical sector address of the write request, step 652. In step 654, a check is performed to determine whether the write request ends on a physical sector boundary. If the requested write area ends on a physical boundary, the process skips to step 730.

If the requested write instruction does not end on a physical boundary, READ END LENGTH is set, in step 656, to be the difference between the end of the write request and the next physical boundary. Next, in step 658, the READ HIT flag is set to zero. READ HIT is the same variable used previously, and is simply a flag to indicate whether all of the requested data is present within the cache. This is checked in step 660, and if all of the requested data is not in the cache, the process skips to step 670. If all of the requested data is in the cache, the process moves to step 662, where the READ HIT flag is set to 1.

If STEP NUMBER is not zero at step 674, a DTU control word is generated in step 676 to transfer this last track from the cache to sector buffer 1. If STEP NUMBER is zero at step 764, a DTU control word is generated in step 678 to transfer the last track from the cache to sector buffer 0. As will be recalled, sector buffer 0 and sector buffer 1 are locations reserved within main memory 200 to conveniently hold data from either side of a requested write I/O.

Steps 676 and 678 both result in the process moving to step 680, where a check is made to determine whether read data preceding the last track has been requested. If not, the process skips to step 696. If the data preceding the last track has been requested, step 682 checks to determine whether this data is present in the cache.

If, in step 682, the data preceding the last track is in the cache, the process skips to step 690. Otherwise, the process moves to step 684. If the STEP NUMBER is not zero in step 684 the process will move to step 686 to generate a CMU control word to transfer the data preceding the last track from the disk into sector buffer 1, and the process then skips to step 696. If the STEP NUMBER is zero in step 684, a CMU control word is generated to transfer the data preceding the last track from the disk into sector buffer 0. Then, another check of STEP NUMBER is made at step 690. If the value is not zero, step 692 generates a DTU control word to transfer the data preceding the last track from the cache into sector buffer 1. If the value is zero, then a DTU control word is generated in step 694 to transfer data preceding the last track from the cache into sector buffer 0.

Both steps 692 and 694 lead to step 696, where the physical sector address of the first referenced physical byte is calculated. Then, steps 698 and 700 ensure that if the read I/O does not begin on a physical sector boundary, a CMU control word is generated to discard the length of data between the I/O start and the sector boundary. Step 702 completes the generation of the read I/O for the CMU 210. Step 704 completes the generation of the read I/O for the DTU 212.

At step 706, if READ HIT is one, the process moves to step 708, where the I/O generated in step 704 is sent to the DTU 212 and the DTU busy bit is set. The process then moves to step 724.

If READ HIT is not one at step 706, the DTU I/O is attached to the CMU I/O and sent to the CMU 210 in step 710. The CMU busy bit is also set. Steps 712 and 714 form a waiting loop, waiting for the CMU to finish reading the data required by the DTU 212. When it is finished, step 716 has the CMU sending the attached I/O to the DTU, and the DTU busy bit is set. Steps 718 and 720 form another waiting loop, and moves to step 722 when the CMU has completed this I/O. The CMU busy bit is reset in step 722, and steps 724 and 726 are yet another waiting loop, this time waiting on the DTU 212 to complete its I/O. When the DTU 212 is finished, the DTU busy bit is reset in step 728, and the STEP NUMBER is incremented in step 730.

At this point, step 732, if STEP NUMBER is one, the process jumps back to step 642. If it is not one, the process moves on to step 734 and calculates the beginning physical sector address of the requested write data. If READ BEGIN LENGTH is greater than zero, a CMU control word is generated to transfer this begin data from sector buffer 0 to the disk, steps 736 and 738. A CMU control word is then generated in step 740 to transfer write data from the user buffer to the disk. Steps 742 and 744 then zero-fill the logical sector, and if READ END LENGTH is greater than zero, steps 746 and 748 generate a CMU control word to transfer end data from sector buffer 1 to the disk. The process then enters step 616, and the remainder of the process is identical to that of the prior art previously discussed.

In addition to the above description of the execution flow for the present invention, several examples are described below.

Referring to FIG. 7, several single sector examples are discussed.

EXAMPLE 1

An operating system issued read operation starting at logical sector 80 for 2 bytes causes the IOM hardware to discard 64 bytes (0 thru 63) and read the requested 2 bytes (64–65) into the user buffer. The remaining 446 bytes (66 thru 511) in the physical sector are stripped outboard of the IOM hardware.

EXAMPLE 2

Continuing with FIG. 7, an operating system issued write operation starting at logical sector 80 for 180 bytes causes the IOM hardware to generate a read operation, that is, read data starting at physical sector 28 for 64 bytes (0 thru 63) into Sector Buffer 0, continue the read for 180 bytes (64 thru 243) to discard the data, continue the read for 268 bytes (244 thru 511) into Sector Buffer 1, write data starting at physical sector 28 for 64 bytes (0 thru 63) from Sector Buffer 0, continue the write for 180 bytes (64 thru 243) from the user buffer, and continue the write for 268 bytes (244 thru 511) from Sector Buffer 1. In this case, there is no zero fill.

EXAMPLE 3

For an example of zero fill, referring again to FIG. 7, an operating system issued write operation starting at logical sector 80 for 2 bytes causes the IOM hardware to generate a read operation, read data starting at physical sector 28 for 64 bytes (0 thru 63) into Sector Buffer 0, continue the read for 2 bytes (64 thru 65) to discard the user data, continue the read for 178 bytes (66 thru 243) to discard the zero-fill data, continue the read for 268 bytes (244 thru 511) into Sector Buffer 1, write data starting at physical sector 28 for 64 bytes (0 thru 63) from Sector Buffer 0, continue the write for 2 bytes (64 thru 65) from the user buffer, continue the write for 178 bytes (66 thru 243) to zero-fill the remaining logical sector, and continue the write for 268 bytes (244 thru 511) from Sector Buffer 1.

Figure 8:
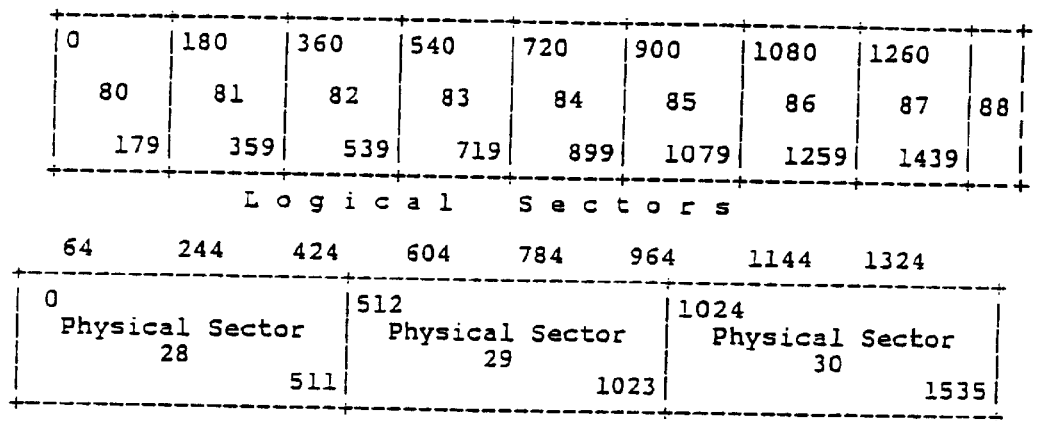
FIG. 8 is a diagram comparing several physical sectors to several logical sectors.

With reference to FIG. 8, some multiple physical sector examples are discussed.

EXAMPLE 4

An operating system issued read operation starting at logical sector 80 for 1026 bytes causes the IOM hardware to discard 64 bytes (0 thru 63) and read the requested 1026 bytes (64 thru 1089) into the user buffer. The remaining 446 bytes (1090 thru 1535) in the physical sector will be stripped outboard of the IOM hardware.

EXAMPLE 5

An operating system issued write operation, without zero fill, starting at logical sector 80 for 1260 bytes (multiple of 180) causes the IOM hardware to generate a read operation, read data starting at physical sector 28 for 64 bytes (0 thru 63) into Sector Buffer 0, continue the read for 1260 bytes (64 thru 1323) to discard the data, continue the read for 212 bytes (1324 thru 1535) into Sector Buffer 1, write data starting at physical sector 28 for 64 bytes (0 thru 63) from Sector Buffer 0, continue the write for 1260 bytes (64 thru 1323) from the user buffer, and continue the write for 212 bytes (1324 thru 1535) from Sector Buffer 1.

EXAMPLE 6

An operating system issued write operation, with zero fill, starting at logical sector 80 for 1026 bytes causes the IOM hardware to generate a read operation, read data starting at physical sector 28 for 64 bytes (0 thru 63 ) into Sector Buffer 0, continue the read for 1026 bytes (64 thru 1089) to discard the user data, continue the read for 54 bytes (1090 thru 1143) to discard the zero-fill data, continue the read for 392 bytes (1144 thru 1535) into Sector Buffer 1, write data starting at physical sector 28 for 64 bytes (0 thru 63) from Sector Buffer 0, continue the write for 1026 bytes (64 thru 1089) from the user buffer, continue the write for 54 bytes (1090 thru 1143) to zero-fill the remaining logical sector, and continue the write for 392 bytes (1144 thru 1535) from Sector Buffer 1.

The following examples will show the mechanics that are involved for a write transfer tag operation on a Read/Modify/Write cycle. In the FIGS. 9 and 11, each "cell" in the physical sector represents one byte; transfer tag bytes are represented by a "T" and data bytes by a "D".

The bytes before and after logical sector 80 in physical sector 28 were previously written with an operation(s) using a transfer tag mode. In write transfer tag mode, the tag in bits 51:4 of a system word is stored on the disk in bits 11:4 of a 16 bit area (e.g. T000 and T001) and the other 12 bits are written with zeros. In read transfer tag mode, the tag stored on the disk in bits 11:4 of a 16 bit area (e.g. T000 and T001) is written into bits 51:4 of a system word and the other 12 bits are discarded.

EXAMPLE 7

Figures 9, 10:
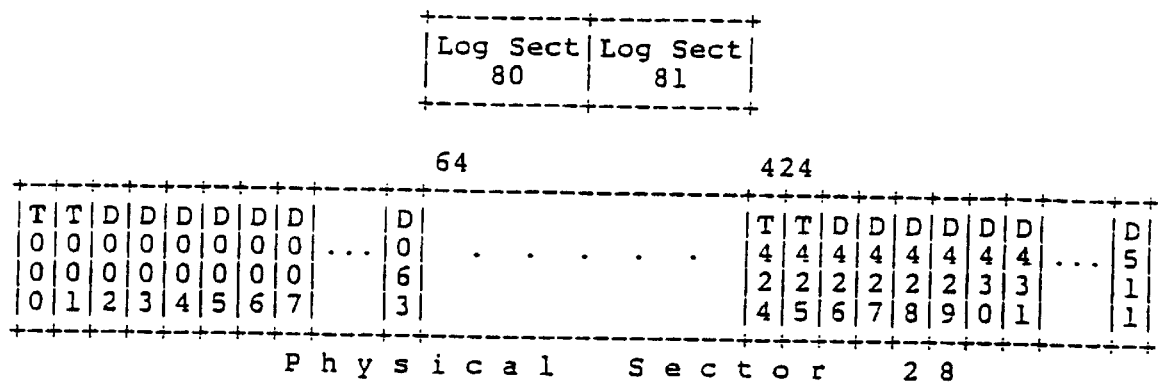
FIG. 9 is a diagram illustrating the layout of a physical sector under force tag mode.
FIG. 10 is a diagram illustrating the breakdown of four system words including bytes from the physical sector of FIG. 9.

Referring to FIGS. 9 and 10, an operating system issued write operation staring at logical sector 80 for 45 system words (360 bytes) causes the IOM hardware to generate a read operation, read data starting at physical sector 28 for 64 bytes (T000 thru D063) using force tag mode (FIG. 10) into Sector Buffer 0, continue the read for 360 bytes (64 thru 423) to discard the data, continue the read for 88 bytes (T424 thru D511) using force tag mode (like FIG. 10) into Sector Buffer 1, write data starting at physical sector 28 for 64 bytes (T000 thru D063) using force tag mode (FIG. 10) from Sector Buffer 0, continue the write for 360 bytes (64 thru 423) using the tag control specified in the IOMK (i.e., transfer tag mode) from the user buffer, and continue the write for 88 bytes (T424 thru D511) using force tag mode (like FIG. 10) from Sector Buffer 1.

In this example, transfer tag mode could have been used to transfer data that is not in the user area. However, in the exemplary embodiment of the present invention, force tag mode is used on both operations of a Read/Modify/Write cycle to transfer data that is not in the user area because the IOU 208 does not know if 16 bits (force tag mode) or only 4 bits (transfer tag mode) bits valid on the disk every 8 bytes, and therefore, assumes the larger number is valid (i.e., force tag mode was used to write the disk).

The bytes before and after logical sector 80 in physical sector 28 were previously written with an operation(s) using force tag mode. In read force tag mode, the first two bytes (e.g. D000 and D001) read from the disk on an IOU 208 generated read operation and are written into bits 47:16 of a system word. In write force tag mode, the force tag value is not stored on the disk and the first two bytes (e.g. D000 and D001) written to the disk, when rewriting data on a Read Modify Write cycle, are from bits 47:16 of a system word.

EXAMPLE 8

Figure 11:
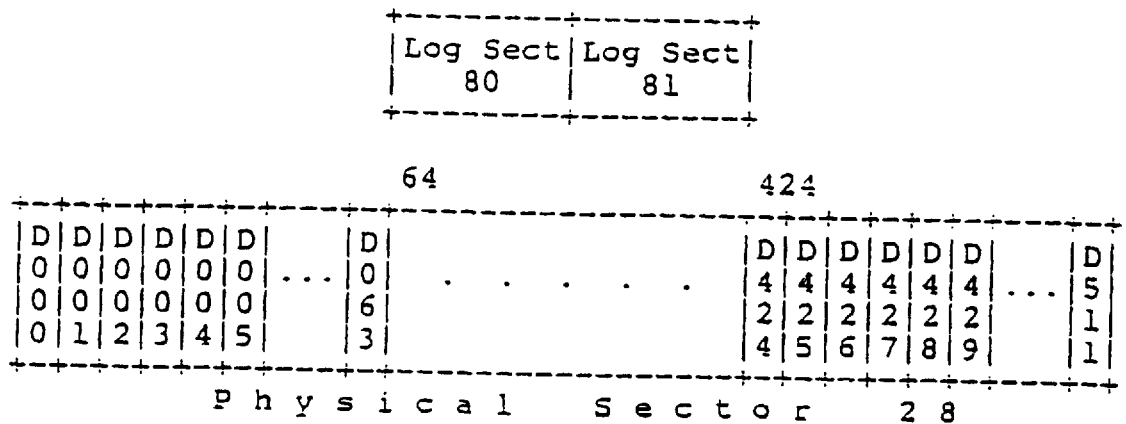
FIG. 11 is a diagram illustrating the layout of a physical sector without force tag mode.
Figure 12:
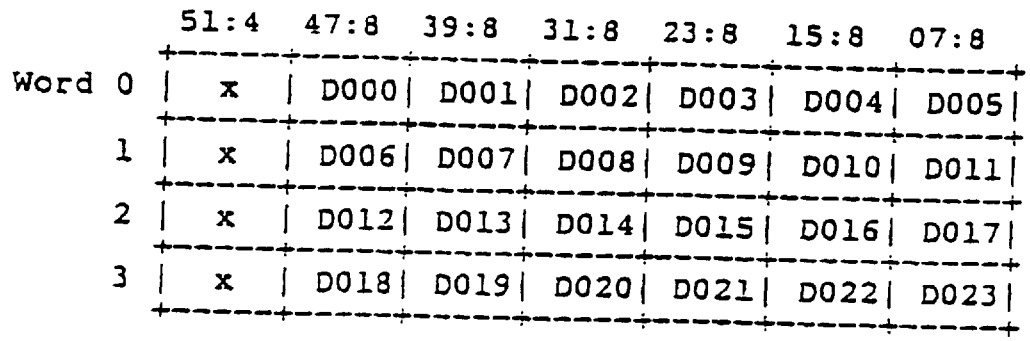
FIG. 12 is a diagram illustrating the breakdown of four system words including bytes from the physical sector of FIG. 11.

Referring to FIGS. 11 and 12, an operating system issued write operation starting at logical sector 80 for 45 system words (360 bytes) causes the IOM hardware to generate a read operation, read data starting at physical sector 28 for 64 bytes (D000 thru D063) using force tag mode (FIG. 12) into Sector Buffer 0, continue the read for 360 bytes (D064 thru D423) to discard the data, continue the read for 88 bytes (D424 thru D511) using force tag mode (like FIG. 12) into Sector Buffer 1, write data starting at physical sector 28 for 64 bytes (D000 thru D063) using force tag mode (FIG. 12) from Sector Buffer 0, continue the write for 360 bytes (D064 thru D423) using the tag control specified in the IOMK is (i.e., transfer tag mode) from the user buffer, and continue the write for 88 bytes (D424 thru D511) using force tag mode (like FIG. 12) from Sector Buffer 1.

In this example, if transfer tag mode was used to transfer data that is not in the user area, 12 bits (15:4 and 7:8) in a 16 bit area on disk every 8 bytes would be corrupted (i.e., zeroed).

The above examples were presented assuming a 512 byte sector size for the physical sector. The following examples (read and write) are based on an arbitrary 720 byte (multiple of 180) physical sector size and assume emulation of a 180 Byte Sector Disk is intended, if necessary. When the physical sector size is a multiple of 180, a logical sector boundary sometimes aligns with a physical sector boundary. A few examples show the advantage of logical sectors beginning or ending on a physical sector boundary. Physical sector byte positions are given within parentheses and are relative to physical sector 0 byte 0.

Figure 13:
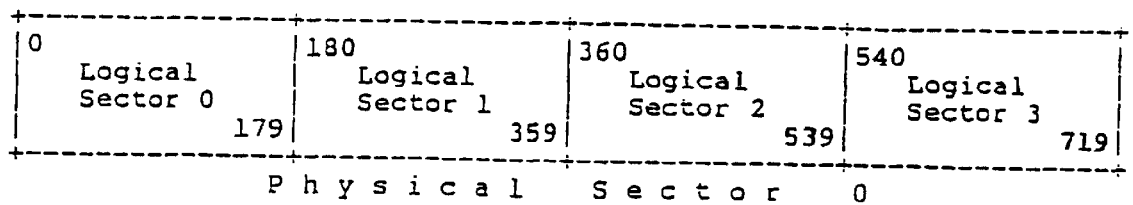
FIG. 13 is a diagram comparing one physical sector of 720 bytes to several logical sectors of 180 bytes.

Referring to FIG. 13, some single physical sector examples are described below.

EXAMPLE 9

An operating system issued read operation starting at logical sector 0 for 2 bytes causes the IOM hardware to read the requested 2 bytes (0 thru 1) into the user buffer. The remaining 718 bytes (2 thru 719) in the physical sector are stripped outboard of the IOM hardware.

It should be noted that the IOM hardware could handle this example without any changes because the logical and physical sectors align.

EXAMPLE 10

Continuing with FIG. 13, an operating system issued read operation starting at logical sector 1 for 2 bytes causes the IOM hardware to discard 180 bytes (0 thru 179) and read the requested 2 bytes (180 thru 181) into the user buffer. The remaining 538 bytes (182 thru 719) in the physical are stripped outboard of the IOM hardware.

EXAMPLE 11

Without a read/modify/write, an operating system issued write operation starting at logical sector 0 for 720 bytes (multiple of 180 and physical sector size) causes the IOM hardware to write the requested 720 bytes (0 thru 719) from the user buffer.

Again, it should be noted that the IOM hardware could handle this example without any changes (except for logical sector to physical sector address translation) because the logical and physical sectors align.

EXAMPLE 12

Referring again to FIG. 13, an operating system issued write operation starting at logical sector 1 for 540 bytes (multiple of 180) causes the IOM hardware to generate a read operation, read data starting at physical sector 0 for 180 bytes (0 thru 179) into Sector Buffer 0, the remaining 540 bytes (180 thru 719) in the physical sector are stripped outboard of the IOM hardware, write data starting at physical sector 0 for 180 bytes (0 thru 179) from Sector Buffer 0, and continue the write for 540 bytes (180 thru 719) from the user buffer.

EXAMPLE 13

An operating system issued write operation starting at logical sector 0 for 540 bytes (multiple of 180) causes the IOM hardware to generate a read operation, read data starting at physical sector 0 for 540 bytes (0 thru 539) to discard the data, continue the read for 180 bytes (540 thru 719) into Sector Buffer 1, write data starting at physical sector 0 for 540 bytes (0 thru 539) from the user buffer, and continue the write for 180 bytes (540 thru 719) from Sector Buffer 1.

EXAMPLE 14

An operating system issued write operation starting at logical sector 1 for 180 bytes causes the IOM hardware to generate a read operation, read data starting at physical sector 0 for 180 bytes (0 thru 179) into Sector Buffer 0, continue the read for 180 bytes (180 thru 359) to discard the data, continue the read for 360 bytes (360 thru 719) into Sector Buffer 1, write data starting at physical sector 0 for 180 bytes (0 thru 179) from Sector Buffer 0, continue the write for 180 bytes (180 thru 359) from the user buffer, and continue the write for 360 bytes (360 thru 719) from Sector Buffer 1.

EXAMPLE 15

An operating system issued write operation starting at logical sector 1 for 2 bytes causes the IOM hardware to generate a read operation, read data starting at physical sector 0 for 180 bytes (0 thru 179) into Sector Buffer 0, continue the read for 2 bytes (180 thru 181) to discard the user data, continue the read for 178 bytes (182 thru 359) to discard the zero-fill data, is continue the read for 360 bytes (360 thru 719) into Sector Buffer 1, write data starting at physical sector 0 for 180 bytes (0 thru 179) from Sector Buffer 0, continue the write for 2 bytes (180 thru 181) from the user buffer, continue the write for 178 bytes (182 thru 359) to zero-fill the remaining logical sector, and continue the write for 360 bytes (360 thru 719) from Sector Buffer 1.

Figure 14:
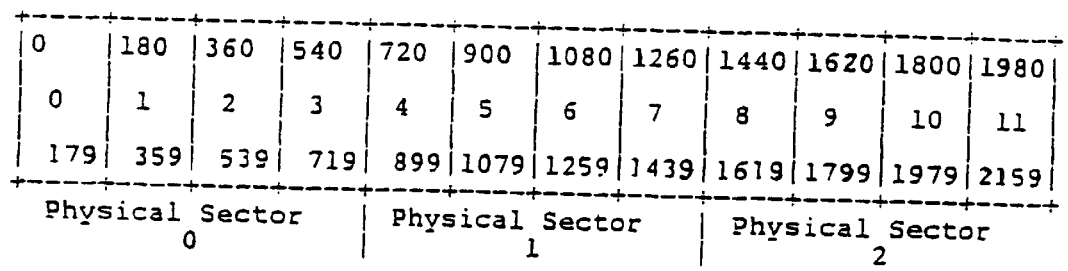
FIG. 14 is a diagram comparing several physical sectors to several logical sectors.

Referring to FIG. 14, some examples of multiple physical sector operations are described.

EXAMPLE 16

An operating system issued read operation starting at logical sector 0 for 1442 bytes causes the IOM hardware to read the requested 1442 bytes (0 thru 1441) into the user buffer. The remaining 718 bytes (1442 thru 2159) in the physical sector are stripped outboard of the IOM hardware.

EXAMPLE 17

An operating system issued read operation starting at logical sector 1 for 1442 bytes causes the IOM hardware to discard 180 bytes (0 thru 179) and read the requested 1442 bytes (180 thru 1621) into the user buffer. The remaining 538 bytes (1622 thru 2159) in the physical sector are stripped outboard of the IOM hardware.

EXAMPLE 18

An operating system issued write operation starting at logical sector 0 for 2160 bytes (multiple of 180 and physical sector size) causes the IOM hardware to write the requested 2160 bytes (0 thru 2159) from the user buffer.

EXAMPLE 19

An operating system issued write operation starting at logical sector 1 for 1980 bytes (multiple of 180) causes the IOM hardware to generate a read operation, read data starting at physical sector 0 for 180 bytes (0 thru 179) into Sector Buffer 0, the remaining 540 bytes (180 thru 719) in the physical sector 0 are stripped outboard of the IOM hardware (it should be noted that the last two physical sectors were not read because the end boundaries were aligned), write data starting at physical sector 0 for 180 bytes (0 thru 179) from Sector Buffer 0, and continue the write for 1980 bytes (180 thru 2159) from the user buffer.

EXAMPLE 20

An operating system issued write operation starting at logical sector 0 for 1980 bytes (multiple of 180) causes the IOM hardware to generate a read operation, read data starting at physical sector 2 for 540 bytes (1440 thru 1979) to discard the data (it should be noted the first two physical sectors were not read because the beginning boundaries aligned), continue the read for 180 bytes (1980 thru 2159) into Sector Buffer 1, write data starting at physical sector 0 for 1980 bytes (0 thru 1979) from the user buffer, and continue the write for 180 bytes (1980 thru 2159) from Sector Buffer 1.

EXAMPLE 21

An operating system issued write operation starting at logical sector 1 for 1620 bytes (multiple of 180) causes the IOM hardware to generate a read operation, read data starting at physical sector 0 for 180 bytes (0 thru 179) into Sector Buffer 0, continue the read for 1620 bytes (180 thru 1799) to discard the data, continue the read for 360 bytes (1800 thru 2159) into Sector Buffer 1, write data starting at physical sector 0 for 180 bytes (0 thru 179) from Sector Buffer 0, continue the write for 1620 bytes (180 thru 1799) from the user buffer, and continue the write for 360 bytes (1800 thru 2159) from Sector Buffer 1.

EXAMPLE 22

An operating system issued write operation starting at logical sector 1 for 1442 bytes causes the IOM hardware to generate a read operation, read data starting at physical 0 for 180 bytes (0 thru 179) into Sector Buffer 0, continue the read for 1442 bytes (180 thru 1621) to discard the user data, continue the read for 178 bytes (1622 thru 1799) to discard the zero-fill data, continue the read for 360 bytes (1800 thru 2159) into Sector Buffer 1, write data starting at physical sector 0 for 180 bytes (0 thru 179) from Sector Buffer 0, continue the write for 1442 bytes (180 thru 1621) from the user buffer, continue the write for 178 bytes (1622 thru 1799) to zero-fill the remaining logical sector, and continue the write for 360 bytes (1800 thru 2159) from Sector Buffer 1.

Since many examples have already been given, the disk caching examples are limited to the more difficult ones. It should be noted that no operating system initiated read operation examples are included because they are similar to full track reads except the data preceding the first logical user sector is sometimes discarded.

In the following examples, byte positions are not given, as in previous examples, due to the complexity of the figures but rather the different parts of each operation are shown. In the exemplary embodiment of the present invention, two cache buffers (pages) are used to store the data since the logical track arbitrarily contains too many bytes to fit into one cache buffer. It should be noted that the various entities shown in the figures are not proportional and are simply intended to illustrate various interrelationships.

Figure 15:
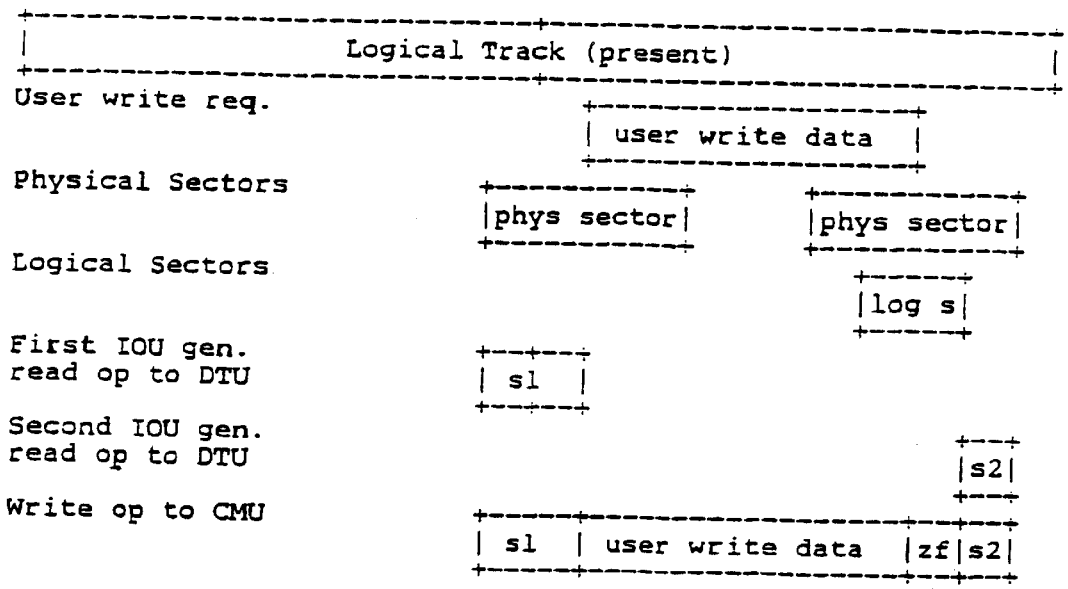
FIG. 15 is a diagram illustrating the interrelationships which exist when performing a caching write operation with a logical track present.

Referring to FIG. 15, an example having data present is described.

EXAMPLE 23

A Read/Modify/Write cycle is necessary since the user data does not begin and end on physical sector boundaries. However, no IOU 208 generated read operations are necessary to the CMU 210 because the rewrite data is present in the cache. Separate IOU 208 generated read operations are issued to the DTU 212 which reads data from the cache to the Sector Buffer.

The first IOU 208 generated read operation starts on a physical sector boundary to read the begin physical sector data into Sector Buffer 0. Once the first read completes, the second IOU 208 generated read is operation starts on a logical sector boundary to read the end physical sector data into Sector Buffer 1. Once the second read completes, the CMU write operation writes the begin physical sector data from Sector Buffer 0, writes the user data from the user buffer, zero-fills the remaining logical sector, and writes the end physical sector data from Sector Buffer 1. DTU 212 updates the cache in parallel with the CMU 210 operation.

Figure 16:
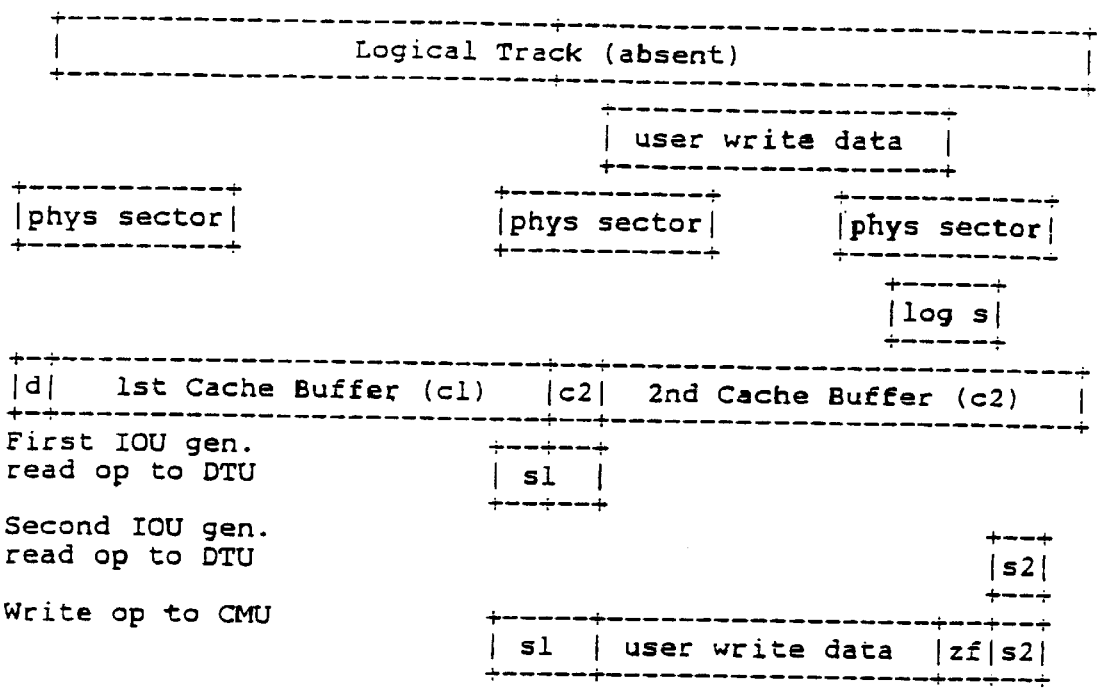
FIG. 16 is a diagram illustrating the interrelationships which exist when performing a caching write operation with a logical track absent.

Referring to FIG. 16, an example having one track cached is described.

EXAMPLE 24

A Read Modify Write cycle is necessary since the user data does not begin and end on physical sector boundaries. Only one logical track is read since the begin physical sector data, user data, and end physical sector data are contained within the same track. The CMU 210 makes the track present in the cache and the DTU 212 updates the Sector Buffer with the rewrite data.

An IOU 208 generated read operation is issued to the CMU 210 starting on a physical sector boundary to discard the data preceding the first logical sector, read the first half of the logical track into the first cache page, read part of the second half of the logical track into the second cache page, release the DTU 212 side job (if early release), and finish reading the second half of the track into the second cache page. When the DTU 212 side job is released, the DTU 212 reads the begin physical sector data into Sector Buffer 0.

Once the DTU 212 and CMU 210 operations are completed, the second IOU 208 generated read operation to the DTU 212 starts on a logical sector boundary to read the end physical sector data into Sector Buffer 1. It should be noted that there is no need for a CMU 210 operation since the first CMU 210 read made the track present in the cache.

Once the second read completes, the CMU 210 write operation writes the begin physical sector data from Sector Buffer 0, writes the user data from the user buffer, zero-fills the remaining logical sector, and writes the end physical sector data from Sector Buffer 1. The DTU 212 updates the cache in parallel with the CMU 210 operation.

Figure 17:
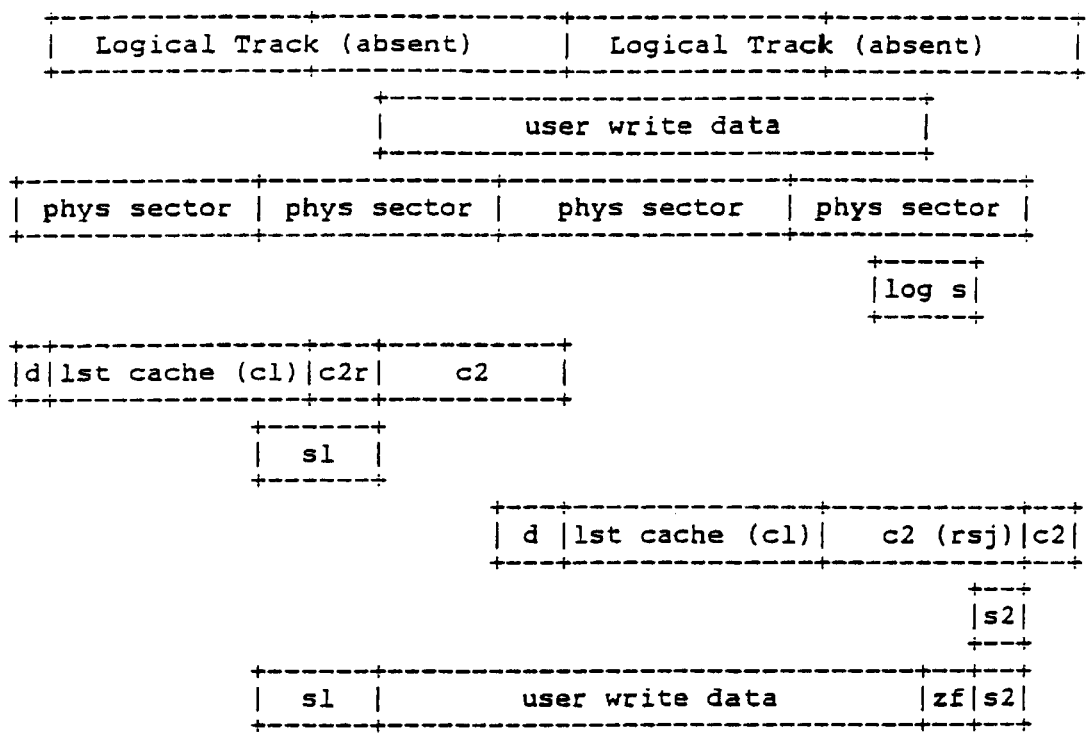
FIG. 17 is a diagram illustrating the interrelationships which exist when performing a caching write operation with two logical tracks absent.

Referring to FIG. 17, an example having two tracks cached is described.

EXAMPLE 25

A Read/Modify/Write cycle is necessary since the user data does not begin and end on physical sector boundaries. Two logical tracks are read since the begin physical sector data and end physical sector data are in different logical tracks which are both absent. The CMU 210 makes both tracks present in the cache and the DTU 212 updates the Sector Buffer with the rewrite data.

An IOU 208 generated read operation is issued to the CMU 210 starting on a physical sector boundary to discard the data preceding the first logical sector for the first logical track, read the first half of the logical track into the first cache page, read part of the second half of the logical track into the second cache page, release the DTU side job (if early release), and finish reading the second half of the track into the second cache page. When the DTU side job is released, the DTU 212 reads the begin physical sector data into Sector Buffer 0.

Once the DTU 212 and CMU 210 operations are completed for the first track read, an IOU 208 generated read operation is issued to the CMU 210 starting on a physical sector boundary to discard data preceding the first logical sector for the second logical track, read the first half of the logical track into the first cache page, read part of the second half of the logical track into the second cache page, release the DTU side job (if early release), and finish reading the second half of the track into the second cache page. When the DTU side job is released, the DTU 212 reads the end physical sector data into Sector Buffer 1.

Once the DTU 212 and CMU 210 operations are completed for the second track read, the CMU 210 write operation writes the begin physical sector data from Sector Buffer 0, writes the user data from the user buffer, zero-fills the remaining logical sector, and writes the end physical sector data from Sector Buffer 1. Again, the DTU 212 updates the cache in parallel with the CMU 210 operation.

It should be noted that in the exemplary embodiment of the present invention, an A series computer system activates disk drives with the ability to handle non-180 byte sector formats on an individual basis. This individual activation is performed with non-180 byte sector keys obtained by the users. The A series computer system automatically recognizes the number of disks that have been formatted with non-180 byte Sectors, compares this with activated Non-180 byte Sector Keys, and determines that the user is operating within legal parameters. Users operating in illegal environments receive warning messages.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A method for utilizing a disk access system, having a predetermined logical sector format incorporated therein, with the capability to perform a write operation on a sector-formatted memory having a physical sector format different from the predetermined logical sector format, comprising the steps of:

receiving a write operation request including an address associated with the logical sectors, and write data to be written; over a plurality of physical sectors;

examining a relative difference between the logical sectors associated with the address of the write operation request and the corresponding physical sectors associated with the sector-formatted memory;

storing sector data. originally found in said corresponding physical sectors but outside of the portion of said corresponding physical sectors that is to be overwritten by said write operation request, into a buffer; and writing said sector data and said write data to said corresponding physical sector.

2. A disk access system, having a predetermined logical sector format incorporated therein, having the capability to perform a write operation on a sector-formatted memory having a physical sector format different from the predetermined logical sector format comprising:

means for receiving a write operation request including an address associated with the logical sectors of said disk access system, and data to be written;

means, coupled to said means for receiving, for determining the physical sector addresses affected by said write operation request and physical sector boundaries of said sector-formatted memory;

buffer means, coupled to said means for determining, for storing data from said sector formatted memory originally found outside of the portion of said sector formatted memory that is to be overwritten by said write operation request;

means, coupled to said means for receiving, for completing said write operation by writing said data to be written and data from said buffer means to a physical sector in said sector-formatted memory.

3. The method of claim 1, wherein said step of writing includes the step of:

writing over data originally located outside of the portion of said physical sectors that is to be written over by said write operation request with said sector data; and writing requested write data within portion of said physical sectors that is to be written over by said write operation request.

4. The method of claim 1, wherein said step of storing further comprises the steps of:

establishing a first buffer and a second buffer;

storing, in said first buffer, sector data from said physical sectors located before the portion of said physical sectors which are to be written over; and storing, in said second buffer, sector data from said physical sectors located after the portion of said physical sectors which are to be written over.

5. The disk access system of claim 2, wherein said means for completing further includes:

means for writing over data originally located outside of the portion of said physical sectors that is to be written over by said write operation request with contents of said buffer means; and means for overwriting data originally located within said portion of said physical sectors that is to be written over by said write operation request with said write data.

6. The disk access system of claim 2, wherein said buffer means comprises:

first sector buffer means for storing original data from said physical sectors located before the portion of said physical sectors which are to be written over; and second sector buffer means for storing original data from said physical sectors located after the portion of said physical sectors which are to be written over.

7. The method of claim 1, further comprising the steps of:

determining the amount of sector data that is present in cache memory; and transferring portion of said sector data that is not already present in cache memory, to cache memory from said sector formatted memory.

8. The system of claim 2, further including:

a cache memory, coupled to said sector formatted memory;

means, coupled to said cache memory, for determining the amount of sector data that is already present in cache memory; and means, coupled to said cache memory, for transferring portion of said sector data that is not already present in said cache memory, to cache memory from said sector formatted memory.

* * * * *